United States Patent
Winterfeldt et al.

(10) Patent No.: US 9,047,133 B2
(45) Date of Patent: Jun. 2, 2015

(54) SINGLE, LOGICAL, MULTI-TIER APPLICATION BLUEPRINT USED FOR DEPLOYMENT AND MANAGEMENT OF MULTIPLE PHYSICAL APPLICATIONS IN A CLOUD ENVIRONMENT

(75) Inventors: David Winterfeldt, San Francisco, CA (US); Komal Mangtani, Los Altos, CA (US); Sesh Jalagam, Union City, CA (US); Vishwas Nagaraja, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 324 days.

(21) Appl. No.: 13/411,364

(22) Filed: Mar. 2, 2012

(65) Prior Publication Data

US 2013/0232480 A1    Sep. 5, 2013

(51) Int. Cl.
  *G06F 9/445* (2006.01)
  *G06F 9/50* (2006.01)

(52) U.S. Cl.
  CPC .............. *G06F 9/5066* (2013.01); *G06F 8/60* (2013.01); *G06F 9/5072* (2013.01)

(58) Field of Classification Search
  USPC ................................................. 717/175–177
  See application file for complete search history.

(56) References Cited

U.S. PATENT DOCUMENTS

| | | |
|---|---|---|
| 6,266,809 B1 | 7/2001 | Craig et al. |
| 6,609,128 B1 | 8/2003 | Underwood |
| 6,976,093 B2 | 12/2005 | Lara et al. |
| 7,024,668 B2 | 4/2006 | Shiomi et al. |
| 7,243,306 B1 | 7/2007 | Joshi et al. |
| 7,275,244 B1 | 9/2007 | Bell et al. |
| 7,356,679 B1 | 4/2008 | Le et al. |
| 7,370,322 B1 | 5/2008 | Matena et al. |
| 7,533,381 B2 | 5/2009 | Ando |
| 7,577,722 B1 | 8/2009 | Khandekar et al. |
| 7,634,488 B2 | 12/2009 | Keys et al. |
| 7,874,008 B2 | 1/2011 | Chang et al. |
| 7,971,059 B2 | 6/2011 | Calman et al. |
| 8,074,218 B2 | 12/2011 | Eilam et al. |

(Continued)

FOREIGN PATENT DOCUMENTS

| | | |
|---|---|---|
| EP | 2299360 A1 | 3/2011 |
| EP | 2381363 A2 | 10/2011 |
| JP | 2007-507046 A | 3/2007 |

OTHER PUBLICATIONS

Sun et al., "Simplifying Service Deployment with Virtual Appliances", 2008 IEEE International Conference on Services Computing, Jul. 7, 2008, pp. 265-272.

(Continued)

*Primary Examiner* — Anna Deng

(57) ABSTRACT

A deployment system enables a developer to define a logical, multi-tier application blueprint that can be used to create and manage (e.g., redeploy, upgrade, backup, patch) multiple applications in a cloud infrastructure. In the application blueprint, the developer models an overall application architecture, or topology, that includes individual and clustered nodes (e.g., VMs), logical templates, cloud providers, deployment environments, software services, application-specific code, properties, and dependencies between top-tier and second-tier components. The application can be deployed according to the application blueprint, which means any needed VMs are provisioned from the cloud infrastructure, and application components and software services are installed.

17 Claims, 14 Drawing Sheets

(56) References Cited

U.S. PATENT DOCUMENTS

| | | |
|---|---|---|
| 8,091,084 B1 | 1/2012 | Dobrovolskiy et al. |
| 8,108,912 B2 | 1/2012 | Ferris |
| 8,176,094 B2 | 5/2012 | Friedman |
| 8,176,559 B2 | 5/2012 | Mathur et al. |
| 8,201,237 B1 | 6/2012 | Doane et al. |
| 8,225,093 B2 | 7/2012 | Fok et al. |
| 8,327,357 B2 | 12/2012 | Amsden |
| 8,359,594 B1 | 1/2013 | Davidson et al. |
| 8,375,360 B2 | 2/2013 | I'Anson |
| 8,407,689 B2 | 3/2013 | Dournov et al. |
| 8,429,630 B2 | 4/2013 | Nickolov et al. |
| 8,578,375 B2 | 11/2013 | Pagan et al. |
| 8,584,119 B2 | 11/2013 | Ellington et al. |
| 8,601,226 B1 | 12/2013 | Lappas et al. |
| 8,627,310 B2 | 1/2014 | Ashok et al. |
| 8,682,957 B2 | 3/2014 | Elson et al. |
| 2002/0174421 A1 | 11/2002 | Zhao et al. |
| 2002/0178254 A1 | 11/2002 | Brittenham et al. |
| 2003/0061247 A1 | 3/2003 | Renaud |
| 2004/0030710 A1 | 2/2004 | Shadle |
| 2004/0183831 A1 | 9/2004 | Ritchy et al. |
| 2005/0022198 A1 | 1/2005 | Olapurath et al. |
| 2005/0198303 A1 | 9/2005 | Knauerhase et al. |
| 2005/0257206 A1 | 11/2005 | Semerdzhiev |
| 2005/0278518 A1 | 12/2005 | Ko et al. |
| 2005/0289536 A1 | 12/2005 | Nayak et al. |
| 2006/0010176 A1 | 1/2006 | Armington |
| 2006/0037071 A1 | 2/2006 | Rao et al. |
| 2006/0079356 A1 | 4/2006 | Kodama et al. |
| 2006/0080412 A1 | 4/2006 | Oprea et al. |
| 2006/0136701 A1 | 6/2006 | Dickinson |
| 2006/0136897 A1 | 6/2006 | Laxminarayan et al. |
| 2006/0248522 A1 | 11/2006 | Lakshminarayanan et al. |
| 2007/0058548 A1 | 3/2007 | Babonneau et al. |
| 2007/0204262 A1 | 8/2007 | Ahluwalia et al. |
| 2007/0209035 A1 | 9/2007 | Sonderegger et al. |
| 2008/0046299 A1 | 2/2008 | Simons et al. |
| 2008/0109788 A1 | 5/2008 | Prieto |
| 2008/0163171 A1 | 7/2008 | Chess et al. |
| 2008/0209016 A1 | 8/2008 | Karve et al. |
| 2008/0244577 A1 | 10/2008 | Le et al. |
| 2008/0307414 A1 | 12/2008 | Alpern et al. |
| 2009/0070752 A1 | 3/2009 | Alpern et al. |
| 2009/0070853 A1 | 3/2009 | Chung et al. |
| 2009/0100420 A1 | 4/2009 | Sapuntzakis et al. |
| 2009/0112919 A1 | 4/2009 | De Spiegeleer |
| 2009/0172781 A1 | 7/2009 | Masuoka et al. |
| 2009/0187995 A1 | 7/2009 | Lopatic |
| 2009/0216970 A1 | 8/2009 | Basler et al. |
| 2009/0276771 A1* | 11/2009 | Nickolov et al. ............ 717/177 |
| 2009/0320012 A1 | 12/2009 | Lee et al. |
| 2009/0320019 A1 | 12/2009 | Ellington et al. |
| 2010/0103837 A1 | 4/2010 | Jungck et al. |
| 2010/0131590 A1 | 5/2010 | Coleman et al. |
| 2010/0142447 A1 | 6/2010 | Schlicht et al. |
| 2010/0146425 A1 | 6/2010 | Lance et al. |
| 2010/0175060 A1 | 7/2010 | Boykin et al. |
| 2010/0251328 A1 | 9/2010 | Syed et al. |
| 2010/0257605 A1 | 10/2010 | McLaughlin et al. |
| 2010/0281166 A1 | 11/2010 | Buyya et al. |
| 2010/0318649 A1 | 12/2010 | Moore et al. |
| 2010/0325624 A1 | 12/2010 | Bartolo et al. |
| 2010/0333085 A1 | 12/2010 | Criddle et al. |
| 2011/0004916 A1 | 1/2011 | Schiffman et al. |
| 2011/0029947 A1 | 2/2011 | Markovic |
| 2011/0055707 A1 | 3/2011 | Kimmet |
| 2011/0055714 A1 | 3/2011 | Vemulapalli et al. |
| 2011/0055828 A1 | 3/2011 | Amsden |
| 2011/0061046 A1 | 3/2011 | Phillips |
| 2011/0107411 A1 | 5/2011 | McClain et al. |
| 2011/0126197 A1 | 5/2011 | Larsen et al. |
| 2011/0145790 A1 | 6/2011 | Rajaraman et al. |
| 2011/0145836 A1 | 6/2011 | Wheeler et al. |
| 2011/0153684 A1 | 6/2011 | Yung |
| 2011/0153727 A1 | 6/2011 | Li |
| 2011/0153824 A1 | 6/2011 | Chikando et al. |
| 2011/0167469 A1 | 7/2011 | Letca et al. |
| 2011/0214124 A1 | 9/2011 | Ferris et al. |
| 2011/0231552 A1 | 9/2011 | Carter et al. |
| 2011/0258333 A1 | 10/2011 | Pomerantz et al. |
| 2011/0258619 A1 | 10/2011 | Wookey |
| 2011/0271280 A1 | 11/2011 | Cao et al. |
| 2011/0276713 A1 | 11/2011 | Brand |
| 2011/0296052 A1 | 12/2011 | Guo et al. |
| 2011/0302569 A1 | 12/2011 | Kunze et al. |
| 2012/0072480 A1 | 3/2012 | Hays et al. |
| 2012/0084769 A1 | 4/2012 | Adi et al. |
| 2012/0102481 A1 | 4/2012 | Mani et al. |
| 2012/0151273 A1 | 6/2012 | Or et al. |
| 2012/0159469 A1 | 6/2012 | Laor |
| 2012/0185913 A1* | 7/2012 | Martinez et al. ............ 726/1 |
| 2012/0240135 A1* | 9/2012 | Risbood et al. ............ 719/328 |
| 2012/0254850 A1 | 10/2012 | Hido et al. |
| 2012/0266159 A1* | 10/2012 | Risbood et al. ............ 717/177 |
| 2012/0324116 A1* | 12/2012 | Dorai et al. ............ 709/226 |
| 2013/0006689 A1 | 1/2013 | Kinnear et al. |
| 2013/0041931 A1 | 2/2013 | Brand |
| 2013/0185715 A1 | 7/2013 | Dunning et al. |
| 2013/0218731 A1 | 8/2013 | Elson et al. |
| 2013/0227091 A1* | 8/2013 | Tompkins ............ 709/220 |
| 2013/0232480 A1 | 9/2013 | Winterfeldt et al. |
| 2014/0082167 A1 | 3/2014 | Robinson et al. |

OTHER PUBLICATIONS

International Search Report dated Jun. 28, 2012 in PCT application PCT/US2012/033356, filed Apr. 12, 2012, with written opinion.

Partial European Search Report dated Jul. 1, 2011, Application No. 11163533.0, filed Apr. 21, 2011, 6 pages.

Goodwill, James: "Java Web Applications", O'Reilly, Mar. 15, 2001, pp. 1-3, XP002646828, Retrieved from the Internet: URL: http://onjava.com/lpt/a/671 [retrieved on Jun. 30, 2011].

Goodwill, James: "Deploying Web applications to Tomcat", O'Reilly, Apr. 19, 2001, pp. 1-11, XP002646829, Retrieved from the Internet: URL: http://oreilly.com/lpt/a/780 [retrieved on Jun. 30, 2011].

Laurent Tonon: "Tomcat Architecture Diagram", Apr. 26, 2011, p. 1, XP002646830, Retrieved from the Internet: URL: http://marakana.com/forums/tomcat/general/106.html [retrieved on Jul. 1, 2011].

Leitner P. Application Level Performance Monitoring of Cloud services, Dec. 2012, vol. 9, pp. 1-8.

White page of BMC software, "Virtualization management with BMC and VMware" © 2011 BMC software, 2 pages.

Wei et al., "Managing security of virtual machine images in a cloud environment", Nov. 13, 2009, 6 pages.

Hansen et al., "Scalable Virtual machine storage using local disks", Dec. 2010, 9 pages.

Konstantinou et al.; "An Architecture for Virtual Solution Composition and Deployment in Infrastucture Clouds", Jun. 2009; ACM pp. 9-17.

Michade L Armbrust et al., A View of cloud Computing, 2010 ACM, pp. 50-58; <<http://dl.acm.org/citation.cfm?id=>.

H. Andres Lagar-Cavilla et al.; SnowFlock Rapid Virtual Machine Cloning for Cloud Computing; 2009 ACM; pp. 1-12; <http:dl.acm.org/citation.cfm?id=1519067>.

Matthias Schmidt et al., Efficient distribution of virtual machines for cloud computing; 2010 IEEE; pp. 567-574; <http://ieeexploreieee.org/stamp/stamp.jsp?tp=arnumber=5452476>dlacm.org/citation.

Jacob Gorm Hansen et al., Lithium Machine Storage for the Cloud; 2010 ACM; pp. 15-26; ; <http://dlacm.org/citation.cfm?id=1807134>.

Dave Thomas; Enabling Application Agility—Software as a Service, Cloud Computing and Dynamic Languages; 2008 Jot; pp. 29-32; <http:jot.fm/issues/issue_2008_05/column3.pdf>.

Fen Liu, et al. Saas Integration fro Software Cloud; 2010 IEEE; pp. 402-409 <http://ieeexplore.ieee.org/stamp/stamp.jsp?tp= &arnumber=5557968>.

* cited by examiner

SINGLE, LOGICAL, MULTI-TIER APPLICATION BLUEPRINT USED FOR DEPLOYMENT AND MANAGEMENT OF MULTIPLE PHYSICAL APPLICATIONS IN A CLOUD ENVIRONMENT

CROSS-REFERENCE TO RELATED APPLICATIONS

This application is related to the U.S. patent application Ser. No. 13/411,357 entitled "System and Method for Customizing a Deployment Plan for a Multi-Tier Application in a Cloud Infrastructure"), the U.S. patent application Ser. No. 13/411,376 entitled "Execution of a Distributed Deployment Plan for a Multi-Tier Application in a Cloud Infrastructure", and the United States patent application Ser. No. 13/411,385 entitled "System to Generate a Deployment Plan for a Cloud Infrastructure According to Logical, Multi-Tier Application Blueprint"), which are assigned to the assignee of this application and have been filed on the same day as this application.

BACKGROUND

"Infrastructure-as-a-Service" (also commonly referred to as "IaaS") generally describes a suite of technologies provided by a service provider as an integrated solution to allow for elastic creation of a fully virtualized, network, and pooled computing platform (sometimes referred to as "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

However, deployment tools currently in use are usually a homegrown patchwork of various software products from different vendors. Such tools are generally process-driven with heavy reliance on custom scripts and property files. Additionally, these tools often utilize too much network bandwidth through continuous polling for readiness of execution or rely on a centralized mechanism that causes a central point of resource contention. Traditional deployment tools are also not configured for automation with cloud computing platforms that dynamically provision virtual computing resources.

Further, applications are typically developed with a multi-tier architecture in which functions such as presentation, application processing, and data management are logically separate components. For example, an enterprise's custom banking application that has a multi-tier architecture may use a cluster of application servers (e.g., JBoss Application Servers) to execute in a scalable runtime environment, a relational database management system (e.g., MySQL) to store account data, and a load balancer to distribute network traffic for robustness. To deploy such a multi-tier application, a developer, who understands the architecture of the application, must coordinate with a system administrator, who controls access to computing resources, to determine which computing resources (e.g., computing, networking, and storage) and software services (e.g., software packages) should be provisioned to support execution of the application. However, developers and system administrators typically view an application differently. Developers see an application as a group of components with interdependencies, while system administrators view an application as a series of "runbook" steps to be followed for deployment. As such, there are challenges for developers and system administrators to collaborate on determining deployment requirements for an application.

SUMMARY

One or more embodiments of the present invention provide a deployment system for deploying a multi-tier application to a cloud computing environment. This deployment system enables a developer or "application architect" to create "application blueprints." The application blueprints define the structure of the application, enable the use of standardized application infrastructure components, and specify installation dependencies and default configurations. The application blueprints define the topology for deployment in an infrastructure-agnostic manner to be portable across different cloud computing environments.

According to embodiments, a deployment plan for an application is generated using one such application blueprint described above. The deployment plan is separated and distributed as local deployment plans having a series of tasks to be executed by virtual machines provisioned from a cloud computing environment. Each virtual machine coordinates execution of each task with a centralized deployment module to ensure that tasks are executed in an order that complies with dependencies specified in the application blueprint.

A method of deploying an application having multiple application components, according to an embodiment, includes generating a topology of virtual computing resources and application components executing thereon for supporting execution of the application. The method further includes defining one or more dependencies between the application components, and deploying the application in a cloud environment by provisioning cloud computing resources and installing the application components in the cloud computing resources according to the topology.

A non-transitory computer-readable storage medium includes instructions that, when executed in a computing device, deploy an application having multiple application components, by performing the steps of, in an embodiment, generating a topology of virtual computing resources and application components executing thereon for supporting execution of the application, and defining one or more dependencies between the application components in the topology. The non-transitory computer-readable storage medium further includes instructions for deploying the application in a cloud environment by provisioning cloud computing resources and installing the application components in the cloud computing resources according to the topology.

A computer system for deploying an application having multiple application components includes a system memory and a processor programmed to carry out the steps of, in an embodiment, generating a topology of virtual computing resources and application components executing thereon for supporting execution of the application, and defining one or more dependencies between the application components in the topology. The system memory and processor are further programmed to carry out the step of deploying the application in a cloud environment by provisioning cloud computing resources and installing the application components in the cloud computing resources according to the topology.

DETAILED DESCRIPTION

Figure 1:
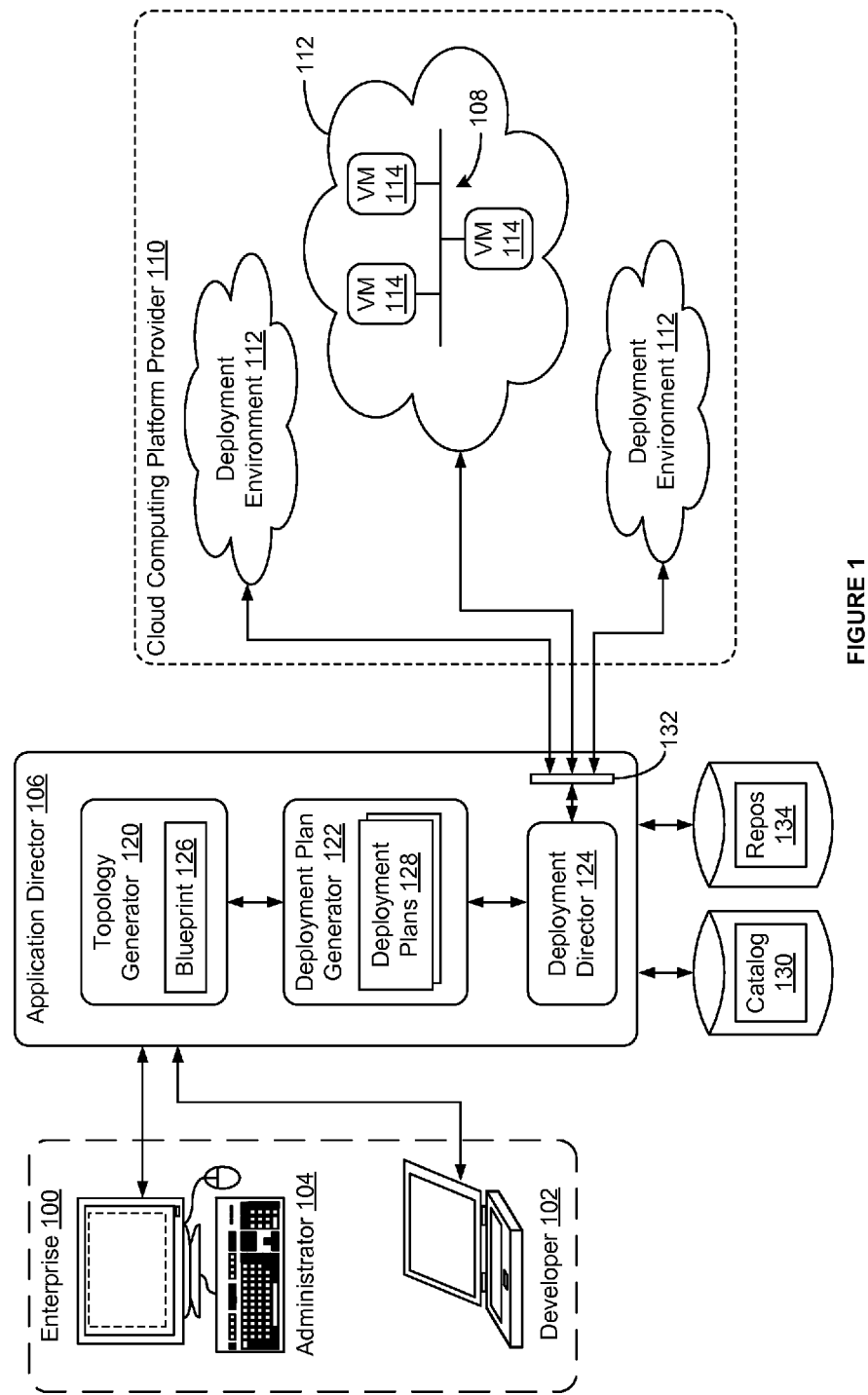
FIG. 1 depicts one embodiment of a system for deploying an application on multiple cloud computing environments.

FIG. 1 depicts one embodiment of a system for deploying an application on multiple cloud computing environments. In this embodiment, a multi-tier application created by developer 102 is being deployed for enterprise 100 in a deployment environment 112 provided by a cloud computing platform provider 110 (sometimes referred to simply as "cloud provider"). As depicted in FIG. 1, cloud computing platform provider 110 may provide multiple deployment environments 112, for example, for development, testing, staging, and production of the application. Enterprise 100 may access services from cloud computing platform provider 110, for example, via REST (Representational State Transfer) APIs (Application Programming Interface) or any other client-server communication protocol. One particular implementation of a REST API for cloud computing services is vCloud Director API available from VMware, Inc. Cloud computing platform provider 110 provisions virtual computing resources (e.g., virtual machines, or "VMs," 114) to provide a deployment environment 112 in which enterprise 100 can deploy its multi-tier application. One particular example of a deployment environment is one implemented using cloud computing services from a vCloud DataCenter available from VMware, Inc. Cloud computing platform provider 110 is shown in greater detail and discussed below in conjunction with FIG. 7.

A developer 102 of enterprise 100 uses an application director 106, which may be running in one or more VMs, to orchestrate deployment of a multi-tier application 108 onto one of deployment environments 112 provided by a cloud computing platform provider 110. As illustrated, application director 106 includes the following software modules: a topology generator 120, a deployment plan generator 122, and a deployment director 124. Topology generator 120 generates a blueprint 126 that specifies a logical topology of the application 108 to be deployed. Blueprint 126 generally captures the structure of an application 108 as a collection of application components executing on virtual computing resources. For example, blueprint 126 generated by application director 106 for an online store application may specify a web application (e.g., in the form of a Java web application archive or "WAR" file comprising dynamic web pages, static web pages, Java servlets, Java classes, and other property, configuration and resources files that make up a Java web application) executing on an application server (e.g., Apache Tomcat application server) and that uses as a database (e.g., MongoDB) as a data store. It is noted that the term "application" is used herein to generally refer to a logical deployment unit, comprised of application packages and their dependent middleware and operating systems. As such, in the example described above, the term "application" refers to the entire online store application, including application server and database components, rather than just the web application itself.

Blueprint 126 may be assembled out of items from a catalog 130, which is a listing of available virtual computing resources (e.g., VMs, networking, storage) that may be provisioned from cloud computing platform provider 110 and available application components (e.g., software services, scripts, code components, application-specific packages) that may be installed on the provisioned virtual computing resources. Catalog 130 may be pre-populated and customized by an administrator 104 (e.g., IT or system administrator) that enters in specifications, configurations, properties, and other details about each item in catalog 130. Blueprint 126 may define one or more dependencies between application components to indicate an installation order of the application components during deployment. For example, since a load balancer usually cannot be configured until a web application is up and running, developer 102 may specify a dependency from an Apache service to an application code package.

Deployment plan generator 122 of application director 106 generates a deployment plan 128 based on blueprint 126 that includes deployment settings for blueprint 126 (e.g., virtual computing resources' cluster size, CPU, memory, networks) and an execution plan of tasks having a specified order in which virtual computing resources are provisioned and application components are installed, configured, and started. Deployment plan 128 provides an IT administrator with a process-oriented view of blueprint 126 that indicates discrete steps to be performed to deploy application 108. Different deployment plans 128 may be generated from a single blueprint 126 to test prototypes (e.g., new application versions), to scale-up and scale down deployments, or deploy application 108 to different deployment environments 112 (e.g., testing, staging, production).

Deployment director 124 of application director 106 executes deployment plan 128 by communicating with cloud computing platform provider 110 via a cloud interface 132 to provision and configure VMs 114 in a deployment environment 112, as specified by deployment plan 128. Cloud interface 132 provides a communication abstraction layer by which application director 106 may communicate with a heterogeneous mixture of cloud provider 110 and deployment environments 112. Deployment director 124 provides each VM 114 with a series of tasks specific to the receiving VM 114 (herein referred to as a "local deployment plan"). The tasks may be scripts that are executed by VMs 114 to install, configure, and/or start one or more application components. For example, a task may be a script that, when executed by a VM 114, causes VM 114 to retrieve and install particular software packages from a central package repository 134. Deployment director 124 coordinates with VMs 114 to execute the tasks in an order that observes installation dependencies between VMs 114 according to deployment plan 128. After application 108 has been deployed, application director 106 may be utilized to monitor and modify (e.g., scale) the deployment.

Figure 2:
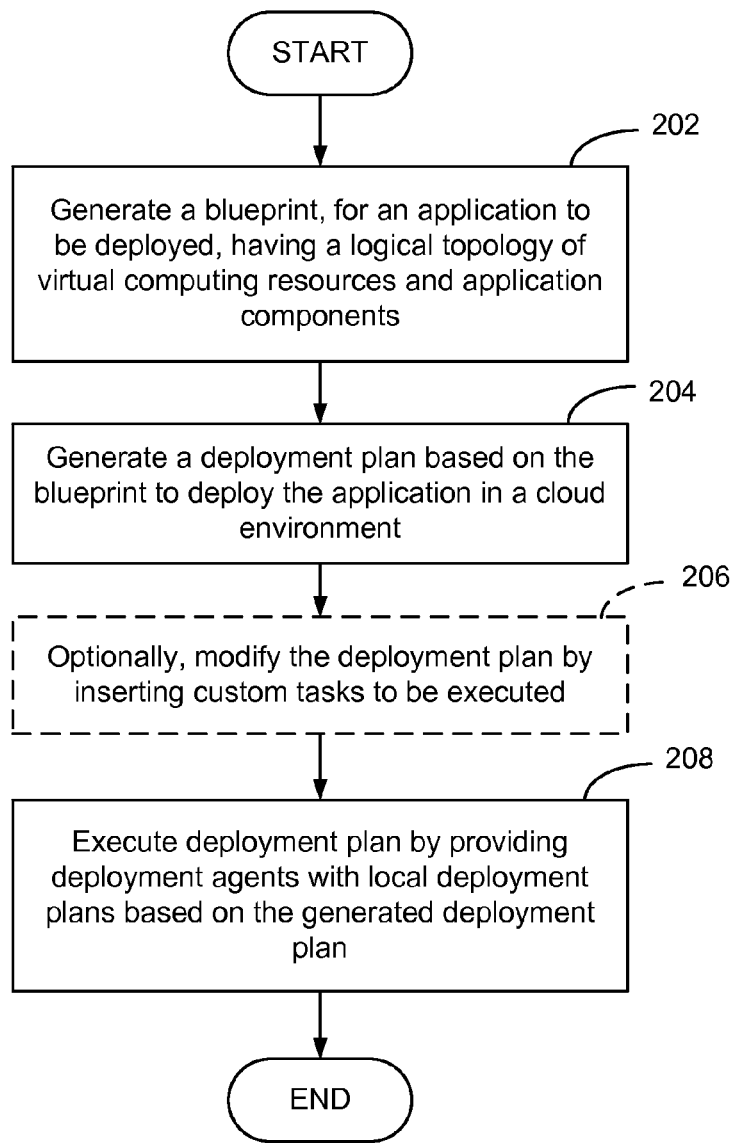
FIG. 2 is a flow diagram for deploying an application on a cloud computing environment

FIG. 2 is a flow diagram of an exemplary deployment method performed by application director 106 to deploy an application in a deployment environment 112 provided by cloud computing platform provider 110. It should be recognized that, even though the method is described in conjunction with the systems of FIG. 1, any system configured to perform the method steps, in any order, is within the scope of embodiments of the invention.

In step 202, in response to user inputs (e.g., from developer 102), application director 106 generates a blueprint 126, for an application to be deployed, that includes a logical topology of virtual computing resources and application components for supporting the application. In one implementation, developer 102 may utilize a graphical user interface provided by application director 106 to assemble and arrange items from catalog 130 into a topology that represents virtual computing resources and application components for supporting execution of application 108.

In step 204, application director 106 generates a deployment plan 128 based on blueprint 126 to deploy application 108 in a specific cloud environment (e.g., deployment environments 112). Step 204 may be carried out in response to user inputs (e.g., from developer 102) that initiate a deployment process for application 108 on a specified deployment environment. In step 206, responsive to user inputs (e.g., from developer 102), application director 106 may optionally modify deployment plan 128 to insert one or more custom tasks to be executed between tasks of deployment plan 128. In step 208, in response to user inputs (e.g., from developer 102) application director 106 executes deployment plan 128 by providing deployment agents executing within deployment environment 112 (e.g., on VMs 114) with local deployment plans based on deployment plan 128. Application director 106 separates deployment plan 128 into local deployment plans that include a series of tasks to be executed by a VM 114.

Generation of Application Topology

Figure 3A:
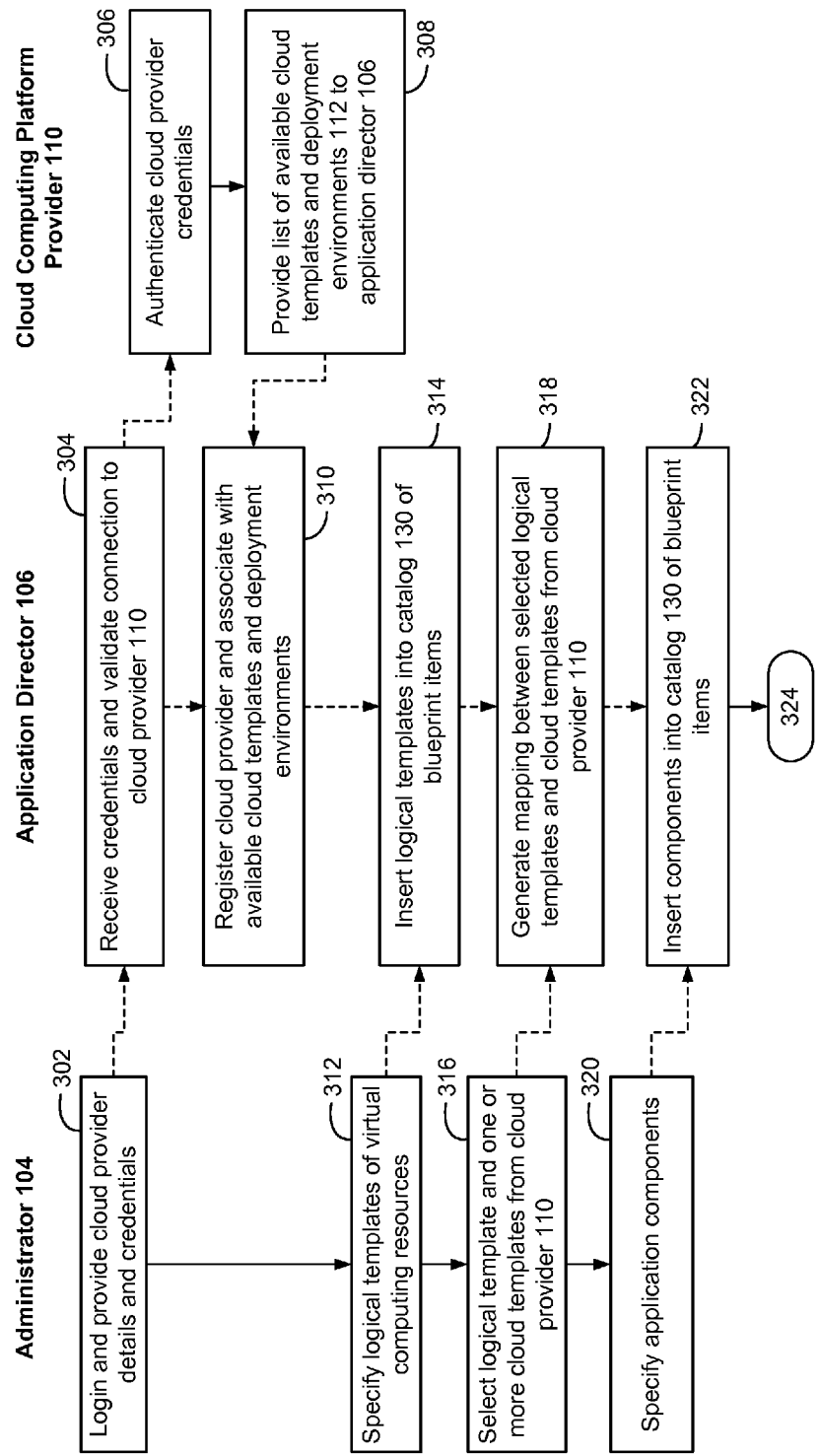
FIGS. 3A and 3B are flow diagrams that illustrate steps for generating an application blueprint for an application.
Figure 3B:
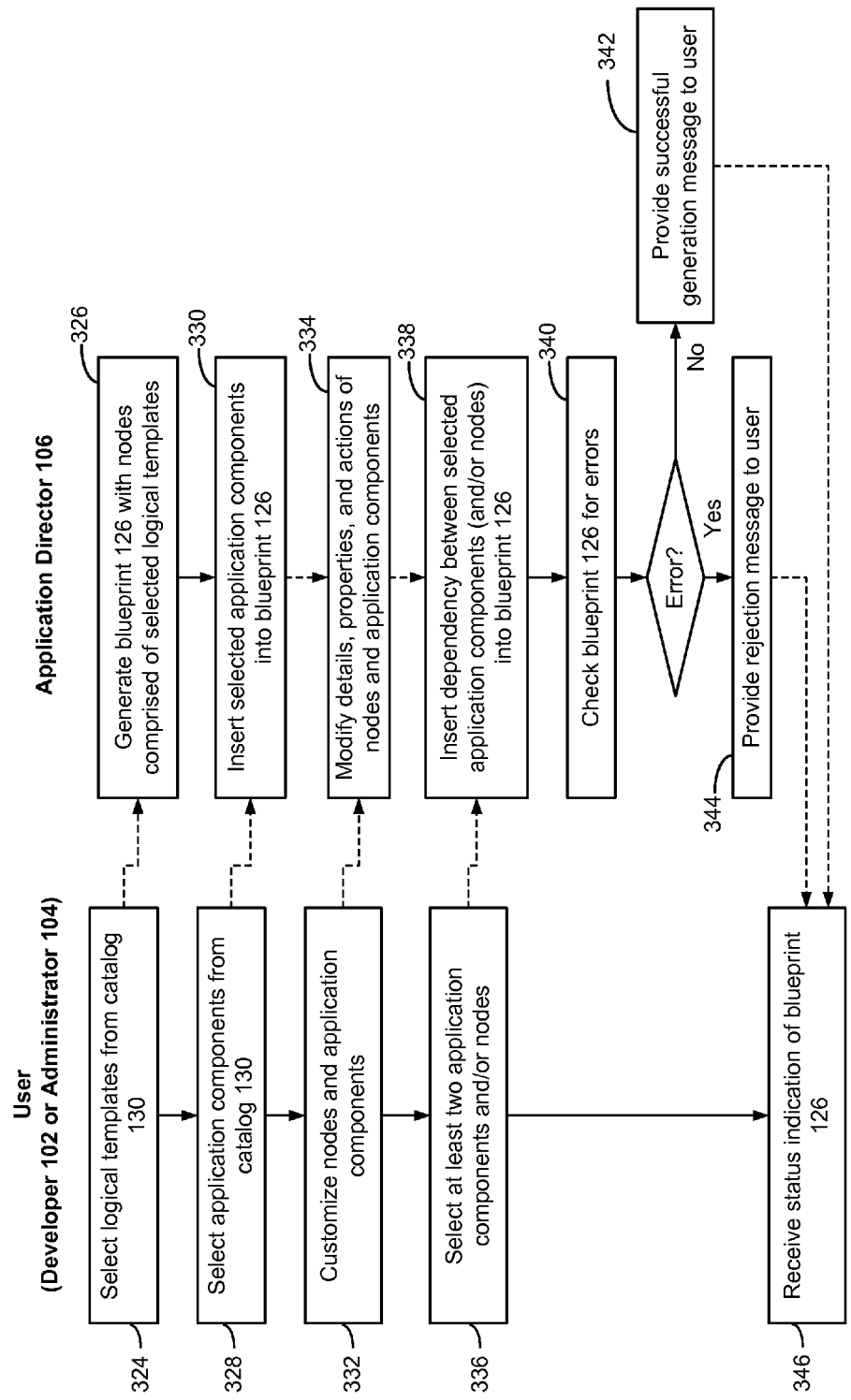

The operations of step 202 are described in further detail in FIGS. 3A and 3B. FIG. 3A is a flow diagram that illustrates steps for configuring application director 106 to generate an application blueprint (e.g., blueprint 126) for an application (e.g., application 108). In step 302, an administrator 104 (or other trusted party having administrative access to IT infrastructure) logs in and provides application director 106 with details and credentials for cloud provider 110. For example, administrator 104 may provide information such as an IP address or hostname at which cloud provider 110 is accessible, and credentials (e.g., a username and password) for an account authorized to make provisioning requests for computing resources. In step 304, application director receives the credentials and attempts to validate a connection to cloud provider 110 using the received credential. In step 306, cloud provider 110 authenticates application director's access to computing resources using the provided credentials.

In step 308, responsive to a successful authentication, cloud provider 110 provides application director 106 with a listing of available virtual machine templates and deployment environments 112. Virtual machine templates are metadata that describes the configuration of a virtual machine, including CPU, memory, network, storage, guest operating system, and other supporting libraries pre-installed and used to repeatedly create a VM having the specified settings. Virtual machine templates that are made available by cloud provider 110 are referred to herein as "cloud templates." In step 310, application director 106 registers cloud provider 110 and stores information about associated cloud templates and deployment environments 112.

In step 312, administrator 104 specifies one or more logical templates that may be mapped to actual virtual machine templates (e.g., cloud templates) provided by cloud providers 110. Logical templates enable application director 106 to define an application topology in a cloud-agnostic manner. As with cloud templates, a logical template may specify virtual computing resources for a virtual machine, such as CPU, memory, networking, storage, guest operating system, pre-installed installed runtime environments (e.g., Java Runtime Environment), and application services and commands (e.g., ssh, wget). For example, one logical template may specify a virtual machine having a guest operating system CentOS version 5.6 supporting 32-bit architecture, while another logical template may specify a virtual machine having Red Hat Enterprise Linux 6.1 supporting 64-bit architecture. In one embodiment, administrator 104 specifies a name, description, and descriptive metadata for each logical template. Descriptive metadata, for example, such as non-hierarchical keywords or "tags," are used to organize listings of logical templates and enhance readability of logical templates during blueprint creation. For example, administrator 104 may tag a logical template as a "Database Servers" tag and/or an "OS Templates" tag. Because some application components may not run on all operating systems, administrator 104 may use descriptive metadata to label operating systems installed and supported by the logical templates. Such "operating system tags" provide system compatibility metadata that may be used to later limit which application components can be added to a logical template. For example, if an administrator 104 specifies a logical template having Ubuntu OS installed, application director 106 may prevent a developer 102 from later attempting to add a software service that does not run on Ubuntu onto this logical template.

As part of the logical template definition, administrator 104 may specify one or more software services that are preinstalled on the logical template, along with the guest operating system. For example, in some cases, a performance monitoring agent or virus scanner is preinstalled on a logical template. In another example, an application server (e.g., Apache Tomcat application server) may be preinstalled on a logical template to speed up deployment of web applications.

In step 314, application director 106 inserts the specified logical templates into catalog 130 of blueprint items. As a result of their inclusion in catalog 130, logical templates are available to users (e.g., developer 102) when creating blueprints 126 that define application topologies having one or more virtual machines, where each virtual machine is represented by each instance of a logical template. For example, the inserted logical template may now appear in a listing of logical templates shown during creation of application blueprints.

In step 316, administrator 104 associates each logical template with one or more cloud templates that have been published by cloud provider 110 as available for provision. In step 318, application director 106 generates a mapping between the selected logical templates and one or more cloud templates. Administrator 104 may map multiple cloud templates to one logical template to allow for selection of different cloud templates from different cloud providers at deployment time. Even when using the same cloud provider, mapping multiple cloud templates to one logical template enables selection from different cloud templates at deployment time to allow for different template configurations. For example, with multiple cloud templates mapped to the same logical template, a user deploying to a production environment may select a cloud template specifying a large amount of disk space, whereas a deployment to a test or staging environment may call for selection of a cloud template with a small amount of disk space.

In step 320, administrator 104 specifies one or more application components, such as services and code components, which may be installed on a virtual machine for supporting execution of an application. Code components are application-specific binaries, scripts, or processes, for example, written by developer 102 and packaged into one or more files, to provide logic for the application. In catalog 130, code components are represented as types or formats of scripting and application code. Examples of types of code components include Java Archive (JAR) files, Java Enterprise Archive (EAR) files, Java web application archive (WAR) files, Ruby Gems packages, SQL scripts, and other suitable modules of scripting logic.

Services are scripted software that provide a software infrastructure for an application, and are generally reused in multiple applications. Examples of services include application servers (e.g., Rails, Apache Tomcat, JBoss), database servers (e.g., GemFire, MySQL, SQLFire, MongoDB, Postgres), monitoring services (e.g., Hyperic, SpringInsight), web servers (e.g., Apache, VMware vFabric Enterprise Ready Server), messaging services (e.g., RabbitMQ), and other middleware services.

Administrator 104 may specify a name, version (e.g., major, minor, and micro releases), and a textual description for a service. As with logical templates, a definition of a service may include descriptive metadata, such as tags, and information about supported operating systems and components. Tags for a service (e.g. "database," "web servers") are used to organize listing of services during blueprint creation. Information about supported operating systems specifies if a service can only run on a particular operating system. For example, during blueprint creation, application director 106 prevents a service from being added to a logical template unless the logical template contains one of the supported operating systems. For information about supported components, administrator 104 selects what code components can be added to a service during creation of an application blueprint. As such, information about supported components indicates if only a certain type of code component may run on this service. For example, only WAR and JAR components may run in a Java application server or Apache tomcat server instance; only SQL scripts can run in a database server. Administrator 104 may further specify whether a service is or may be pre-installed on a logical template. Services specified as "pre-installed on a template" are available for inclusion in a logical template definition, as described above.

Administrator 104 may specify one or more properties of an application component (e.g., services, code components). Properties for application components are configuration name-value pairs that are exposed for configuration and manipulation by application director 106. In one embodiment, properties of an application component define variables used in installation, configuration, and execution scripts for an application component. For each property, administrator 104 may specify a name (e.g., "port_num," "repos_url"), type (e.g., string, array, content), and a value that represents a variable value to be substituted for this property when a script referencing the property is executed. The value of a property may be a literal or static value (e.g., an "http_port" property having a value of 80), or may reference other properties within the blueprint or referenced components in the blueprint. Properties may also be mapped to dynamic values, such as a database's IP address, which can be then be used by an application to connect to it. For example, a "pkg_path" property may have a value of "http://${director.server.ip}/services/hyperic/installer-4.5-x86-64-linux.tar.gz" which includes a reference (e.g., "${director.server.ip}") to an IP address for a server executing application director 106. As such, during deployment, the value of the pkg_path property is dynamically generated to be the IP address of application director 106 at time of deployment. Property values may be specified as "secured" for passwords and other properties that administrator 104 may wish to obscure from users without administrative privileges (e.g., developer 102).

Administrator 104 may further specify whether a property of an application component is overridable in a blueprint 126 such that other users may redefine this property for a particular application blueprint (i.e., at blueprint creation time) or for a particular deployment (i.e., at deployment time). For example, administrator 104 might configure a Java application server (e.g., Apache tomcat server) service to have a default Java Virtual Machine (JVM) heap size of 512 MB. However, a user (e.g., developer 102) might change this property to 1024 MB to suit for a particularly memory-intensive application or suit a particularly large deployment in a production environment.

Administrator 104 may create installation, configuration, and start scripts for an application component, referred herein as "actions." Actions generally include a script comprised of one or more lines of scripting logic that, when executed by a virtual machine on which the application component is hosted, perform operations for an application lifecycle stage (e.g., install, configure, start, stop, upgrade, migrate, etc.). Operations performed by an action may include requesting installation via a package manager (e.g., yum, apt, dpkg), setting environmental variables, launching runtimes, checking configurations, and other commands. For example, an action for a database service may include an installation script that fetches an application package from a package repository, unpacks the application package, and executes an installer using particular installation settings and variables. Action scripts may be executable by a command-line shell, such as a UNIX shell (e.g., bash) or Windows PowerShell, though other suitable scripting environments are within the scope of the present disclosure.

Administrator 104 specifies a name of the lifecycle stage (e.g., "install," "configure," and "start") for the action and the content of the action script. In one embodiment, application director 106 provides a script editor having a user interface that lists the properties of the application component which are available for configuration, setting, and/or manipulation by the script. Action scripts may reference properties of an application component (e.g., $global_conf, $http_port) to install, configure, or start an application component with settings from catalog 130 defined by administrator 104. An example script for an INSTALL action of an application component (e.g., Apache web server) is shown below in Table 1.

TABLE 1

Sample script for INSTALL action of an application component

!/bin/bash
Import global conf
$global_conf
export PATH=$PATH:/usr/local/sbin:/usr/local/bin:/sbin:/bin
set -e
Tested on CentOS
If [ -x /usr/sbin/selinuxenabled ] &&
　/usr/sbin/selinuxenabled; then TABLE 1-continued Sample script for INSTALL action of an application component

```
if [ -x /usr/sbin/setenforce ]; then
        /usr/sbin/setenforce Permissive
    else
        echo 'SELinux is enabled. This may cause installation to \
fail.'
    fi
fi
yum --nogpgcheck --noplugins -y clean all
yum --nogpgcheck --noplugins -y install httpd
# Ports on which to listen
sed -ie "s/^Listen .*/Listen $http_port\nListen $http_proxy_port/g" \
/etc/httpd/conf/httpd.conf
# Set up auto-start on booting
chkconfig httpd on
```

Referring again to FIG. 2, in step 322, application director 106 inserts the specified application components into catalog 130 of blueprint items. Accordingly, a catalog 130 is generated by administrator 104 that provides standardized virtual machine templates and application infrastructure components having predetermined installation and configuration scripts, such that a user (e.g., developer 102) may quickly create a blueprint of a multi-tier application and avoid having to define each application component from scratch. While administrator 104 may specify any number of logical templates and application components for use by users, it should be recognized that catalog 130 may already include a library of standardized and commonly-used application components. It should further be recognized that administrator 104 may edit and customize any predefined application component in the library of standardized and commonly-used application components.

Operations of FIG. 3A continue to step 324, shown in FIG. 3B. FIG. 3B is a flow diagram that illustrates steps for generating an application blueprint 126 for an application 108 utilizing catalog 130 as generated in FIG. 3A. As described above, a blueprint 126 is an abstract representation of the structure of application 108 as comprised of virtual machines and their corresponding application components, operating systems, dependencies, and configurations. Blueprint 126 standardizes the structure of an application for repeated deployments in multiple and possibly diverse deployment environments.

In step 324, a user (e.g., developer 102 or administrator 104) selects one or more logical templates from catalog 130 of items. In step 326, responsive to user input, application director 106 generates blueprint 126 comprised of the logical templates selected by the user. In one embodiment, upon receiving a selection of logical templates, application director 106 generates a set of "nodes," which each represent a virtual machine, or a cluster of virtual machines, configured according to the selected logical templates. For example, to create a blueprint that models a three-tiered application, a user may select three items from a catalog list of logical templates to create three nodes representing each tier of the application. Application components may be later added to each node to specify which application components are executing on the node. In one implementation, a graphical user interface is provided for modeling a blueprint 126 for the application 108, an example of which is depicted in FIG. 4.

Figure 4:
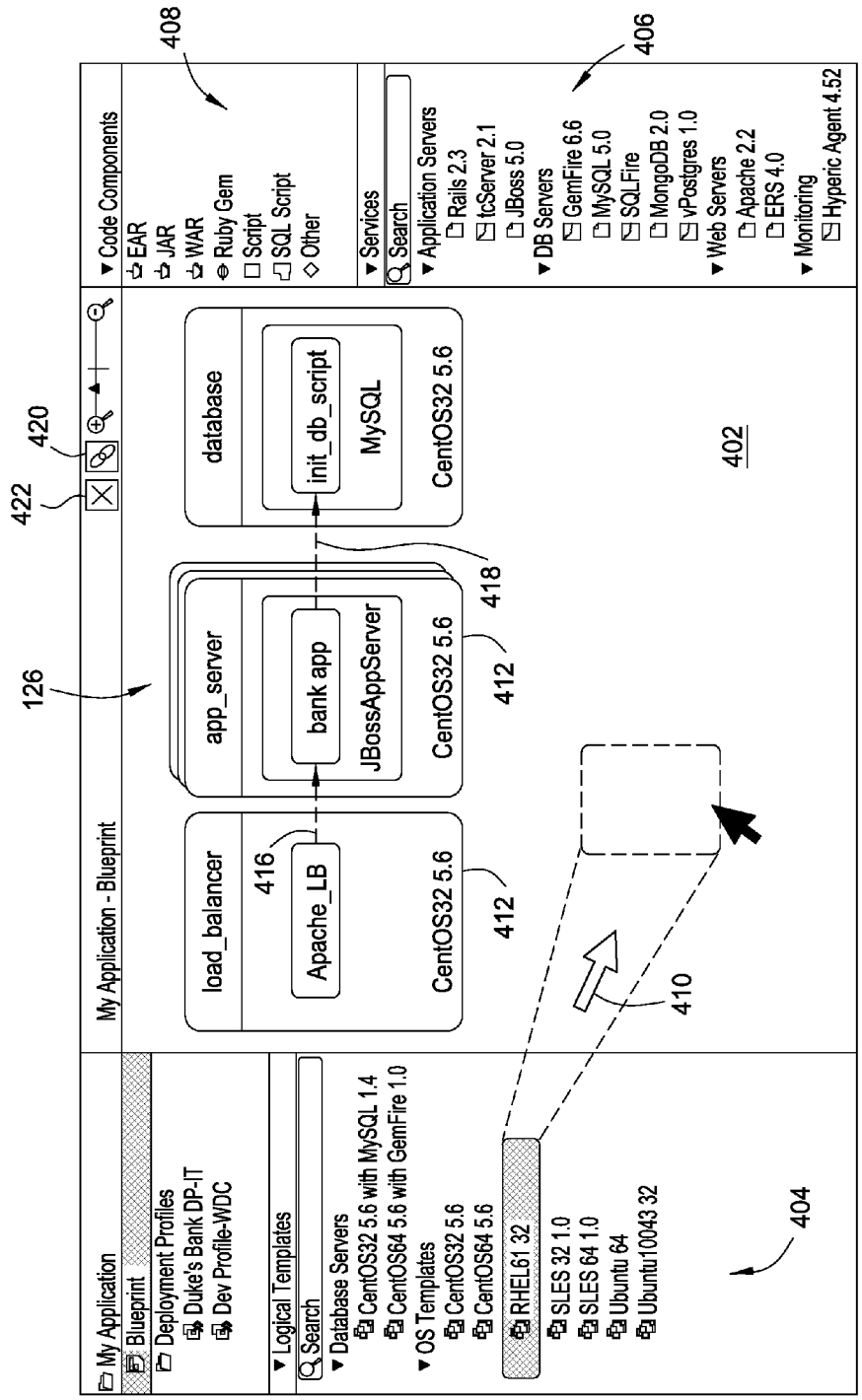
FIG. 4 is a conceptual diagram illustrating a user interface for generating an application blueprint for an application to be deployed.

FIG. 4 illustrates a user interface 400 for generating an application blueprint 126 for an application (e.g., application 108) to be deployed. User interface 400 includes a canvas 402 that provides a graphical view of a blueprint 126 as a schematic diagram of application 108. In the example blueprint 126 shown in FIG. 4, a three-tiered application with a MySQL database, JBoss Application Server, and an Apache load balancer is modeled as having three nodes 412 (labeled as "load_balancer," "app_server," and "database").

User interface 400 includes one or more "palettes" that display items from catalog 130 that are available for use in creating a blueprint. As shown, user interface 400 includes a first palette 404 that lists all logical templates defined in and available from catalog 130, a second palette 406 that lists software services defined in and available from catalog 130, and a third palette 408 that lists types of code components that may be inserted into a blueprint. Canvas 402 provides drag-and-drop functionality that enables the user to select and drag an item from palettes 404, 406, 408 and drop the selected item within the boundaries of canvas 402 to insert the selected item into blueprint 126, as illustrated by arrow 410. In the example shown, each node 412 has been created from a logical template (identified as "CentOS32 5.6" having CentOS 5.6 32-bit operating system installed.

Referring back to FIG. 3B, in step 328, the user selects one or more application components from catalog 130 of application components and selects a node on which the application component may execute. In step 330, responsive to user input, application director 106 inserts the selected application components into blueprint 126 as executing a selected node. In the example three-tiered application in FIG. 4, a user selects a MySQL database item, a JBoss application server, and an Apache web server from palette 406 of services and insert selected item onto a separate node 412. Each node may host multiple application components. Some application components, such as services, may host, execute, and/or deploy certain application components themselves, such as code components. In the three-tiered application example above, the user specifies an application component packaged as an EAR file (identified as "bank_app") as being deployed in the JBoss application server. In another example, the user may specify an SQL script (identified as "init_db_script" that is executed by MySQL database to initialize the database.

In step 332, the user customizes one or more nodes and application components of blueprint 126 by editing details (e.g., labels, descriptions), properties, and actions of the nodes and applications components. The customizations made by the user to the nodes and application components represent application-specific configurations that override or replace default configurations provided by catalog 130.

To allow for scaling deployments, the user may specify a node as a cluster of virtual machines, rather than a single virtual machine, to enable multiple virtual machines to be deployed for that particular node. In the three-tiered application example above, the app_server node has been specified as a cluster, and hence multiple virtual machines of this type can be deployed and managed by the Apache load balancer. As shown, the clustered node is graphically represented as a stack of nodes to distinguish from a singular node. The user specifies a number of virtual machines in the cluster (e.g., 10 VMs). Further, nodes specified as clusters are given special properties that enable action scripts for an application component running on the cluster to be cluster-aware. For example, a special property "node_array_index" may be used by an action script to identify which virtual machine the action script is executing on.

In some deployments, some servers are deployed into an external-facing network, or DMZ, and some servers are deployed to a separate network protected by a firewall. To model this structure, the user may customize a node by defining multiple network interfaces, sometimes referred to as "NICs," to separate data communication with the node into separated sub-networks. For a given node, the user may specify more than one NIC, each NIC having a logical network name (e.g., "MgmtNetwork," "ServiceNetwork"). At deployment time, the named logical network is mapped to an actual cloud network provided by cloud provider 110. In the example three-tiered application example above, the load_balancer node is planned to be the only node that may be accessed from a public network (e.g., Internet); the database and app_server nodes are deployed in a private network. The load_balancer node should be able to access the database and app_server nodes. As such, the load_balancer node is specified with two NICs, a first NIC pointing to a "service" network and a second NIC pointing to a "management" network. The database and app_server nodes each have one NIC pointing to the service network. At deployment time, the service network can be mapped to a cloud network protected by firewall and the management network can be mapped to a public cloud network.

The user may provide a new application-specific property value that overrides or replaces a default property value defined in catalog 130. For example, the user may edit the value of an "http_port" property to configure a customized port number for a given blueprint. The user may only modify properties that have been designated as "overridable" by a definition for the application component in catalog 130. However, the user may designate, at the blueprint level, whether an application-specific property for an application component and/or node is "overridable at deployment" to allow that property to be further customizable at deployment time.

Similarly, the user may modify an action for an application component by customizing a default script (e.g., install, configure, start) corresponding to the action as defined in catalog 130. In step 334, responsive to user input, application director 106 modifies details, properties, and actions for nodes and application components of blueprint 126.

The user may specify one or more dependencies between application components to declare a relationship between the application components that defines an interconnected structure of distributed portions of the application (e.g., multiple tiers of the application). Dependencies may be used to plan deployment of the application by defining a deployment order for application components (e.g., that indicates whether deployment tasks for one item will wait to run until the tasks for the other item has finished). In the three-tiered application example, because a load balancer usually cannot be configured until the web application is up and running, the user has created a dependency from a load balancer (e.g., Apache) to a web application package (e.g., EAR component) to indicate that the load balancer should be deployed after the deployment of the web application is completed.

As such, in step 336, the user may select at least two application components and/or nodes, for example, by using a pointer cursor in user interface 400 to select one or more nodes and/or application components within canvas 402 and creating a dependency between the application components via a link button 420. It is appreciated that the user may later use a pointer cursor to select an existing dependency and delete and/or modify the selected dependency, for example, by pressing a delete button 422. In step 338, responsive to user input, application director 106 inserts a dependency between the selected application components (and/or nodes) into blueprint 126. In the three-tiered application example shown in FIG. 4, a dependency from the Apache load balancer to code component (e.g., "bank_app") is depicted by dashed arrow 416 and represents that the Apache load balancer should be deployed after the installation of the code component (e.g., "bank_app") is completed. Similarly, a second dependency (depicted by dashed arrows 418) from the code component (e.g., "bank_app") to the database initialization script (e.g., "init_db_script") is created to represent that the code component (e.g., "bank_app") should wait until the database node, the database service, and the SQL script initializing the database have all been run before continuing.

In step 340, application director 106 checks the application topology defined by blueprint 126 for errors. For example, application director 106 may verify whether properties have been correctly specified, that application components are not missing from any required actions, or that invalid or circular dependencies have not been created. In step 342, responsive to not detecting any errors within blueprint 126, application director 106 transmits a successful blueprint generation message to the user, and in turn, in step 346, the user receives a status indication regarding generation of blueprint 126. Alternatively, in step 344, responsive to detecting an error within blueprint 126, application director 106 transmits an error message to the user. Application director 106 may provide the user with opportunities to perform one or more remedial actions to correct any detected errors.

Generation of Deployment Plan

From an application blueprint 126, a user may generate multiple deployment plans 128 having configurations customized for a variety of deployment environments and/or cloud providers, for example, for testing prototypes, deploying to staging environments, or upgrading existing deployments. While blueprints 126 provide a component-oriented view of the application topology, deployment plans 128 provide a step-oriented view of the application topology defined in blueprint 126 that depicts time dependencies between tasks to deploy the application components in a particular order. Deployment plans 128 provide settings, such as cloud templates, networks, and application component properties allowed for use in specific deployment environments.

Figure 5:
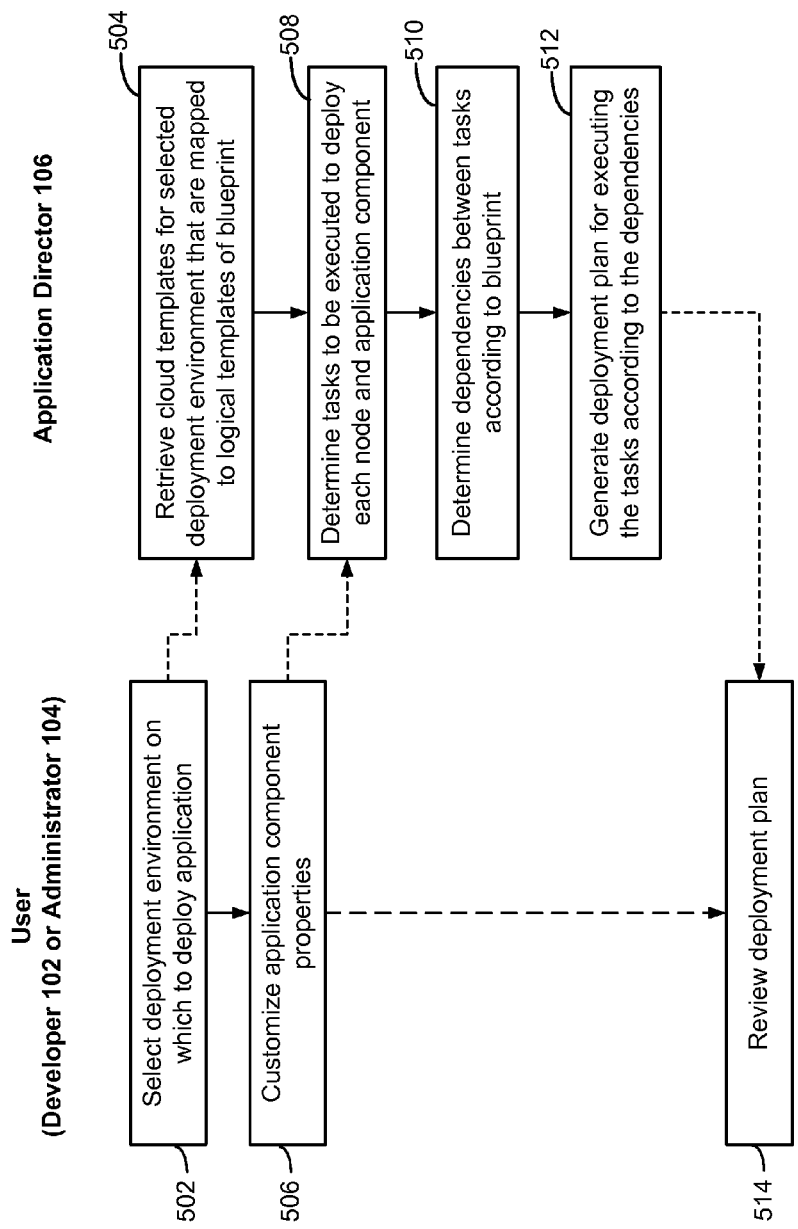
FIG. 5 is a flow diagram that illustrates steps for generating a deployment plan based on an application blueprint.

FIG. 5 is a flow diagram that illustrates steps for generating a deployment plan 128 according to an application blueprint. It should be recognized that, even though the steps are described in conjunction with the systems of FIG. 1, any system configured to perform the method steps, in any order, is within the scope of embodiments of the invention.

In step 502, a user (e.g., developer 102 or administrator 104) selects a deployment environment in which to deploy the application. The deployment environment may be selected from a listing of deployment environments available from by cloud providers 110, for example, as registered in step 310 above. In step 504, application director 106 determines which logical templates are used in the blueprint (e.g., to create nodes 412) and retrieves cloud templates mapped to the logical templates, for example, as mapped in step 318 above, for the selected deployment environment.

Additionally, the user selects a cloud network available from cloud provider 110 for each logical network defined in the blueprint. For example, when deploying a load balancer node to a test environment, the user may select an internal network for both sub-networks (e.g., NICs). When deploying a load balancer node to a production environment, the user may select an internal network for one load balancer NIC and an external network for the other load balancer NIC. Cloud provider 110 provides a listing of available network types that may be mapped to logical networks of the blueprint, for example, including dynamically allocated networks (e.g., DHCP), statically allocated networks (e.g., static IP pool), direct connected (e.g., external) networks, routed networks, and isolated (e.g., private, internal) networks.

In step 506, the user customizes blueprint 126 by specifying deployment-specific configurations of the nodes and application components. The user may provide a new property value for a node or application component that overrides or replaces a default value specified by a definition for the property in catalog 130 or an application-specific value specified by blueprint 126. For example, a blueprint having an Apache Tomcat application component might specify a JVM heap size of 512 MB. However, a user may want to override that application-specific setting to change the heap size to 1024 MB to suit a particularly large deployment in a production environment. In another example, a user may override node properties, such as memory allocation or number of CPUs, which have been defined by catalog 130 to make a more robust deployment. Similar to application-specific customizations, the user may only customize node or application component properties that have been designated as "overridable at deployment" within the blueprint. The customized deployment-specific property values are utilized during execution and/or determination of deployment tasks, described below.

In step 508, application director 106 determines a plurality of tasks to be executed to deploy each node of blueprint 126 and each application component executing thereon. For each node in blueprint 126, application director 106 determines a task that includes a provisioning request to cloud provider 110 to create a corresponding virtual machines or cluster of virtual machines according to the mapped cloud template and property values (e.g., number of CPUs, memory allocation) specified by catalog 130, blueprint 126, and/or deployment plan 128, in ascending order of priority. In the three-tiered application example above, application director 106 determines a task to provision two virtual machines having CentOS 32-bit 5.6 installed (e.g., for database and load_balancer nodes) and a cluster of virtual machines having CentOS 32-bit 5.6 installed (e.g., for app_server node).

For each application component in blueprint 126, application director 106 determines one or more tasks that include execution of action scripts corresponding to each application lifecycle stage defined for the application component. For example, for a load balancer application component, application director 106 determines tasks corresponding to execution of an installation script (e.g. "INSTALL"), a configuration script (e.g. "CONFIGURE"), and a launch script (e.g. "START"). In another example, for an SQL script that initializes a database (e.g., "init_db_script"), application director 106 determines a single task corresponding to execution of the script (e.g., "INSTALL").

In step 510, application director 106 determines one or more deployment time dependences between the tasks according to the application topology defined in blueprint 126. Dependencies between application components and/or nodes defined in blueprint 126 may be used to determine an order in which the application components should be deployed. A dependency defined as "from" a first application component "to" a second application component represents a requirement that tasks for the first application component cannot be performed until the tasks for the second application component have been completed.

Dependencies between application components and/or nodes can explicitly defined in blueprint 126 via insertion by the user in steps 336 and 338 of FIG. 3B (e.g., between the application component and load balancer in FIG. 4). A dependency between application components may be defined between application components in the same node (e.g., "intra-node" dependency) to represent that, at that node, tasks for one application component are performed after tasks for the other application component. Alternatively, dependencies between application components may be defined between application components in different nodes (e.g., "inter-node" dependencies) such that tasks for an application component at a first node are performed after tasks of an application component at a second node have been completed. It is appreciated that this may result in a pause in operations at the first node until the tasks at the second node have been performed.

Additionally, dependencies between application components and/or nodes can be implicitly defined in blueprint 126 via a nested or layered relationship between application components. Tasks for an application component that is a "container" for another application component are ordered within deployment plan 128 to be performed before the tasks for the other application component. For example, for a blueprint 126 having a code component (e.g., JAR web application) executing on an application server (e.g., JBoss), a nested relationship between the code component and application server implicitly defines a dependency from the code component to the application server. As such, tasks for the code component may not be performed until tasks for the application server have been completed. In the three-tiered application example above, the database initialization script (e.g., "init_db_script") is implicitly dependent on the database (e.g., MySQL database) and may not be executed until tasks associated with the database have been performed.

In step 512, application director 106 generates a deployment plan 128 for executing the tasks according to the dependencies determined in step 510, and in turn, in step 514, the user may review the generated deployment plan 128. Deployment plan 128 is generated as a step-wise execution plan having tasks for deploying the application on a plurality of virtual machines provided by cloud provider 110. The stepwise execution plan may be organized by virtual machine according to which virtual machine each task is to be performed on. In one particular implementation, deployment plan 128 may be graphically illustrated to the user in a workflow view, for example, as shown in FIG. 6A.

Figure 6A:
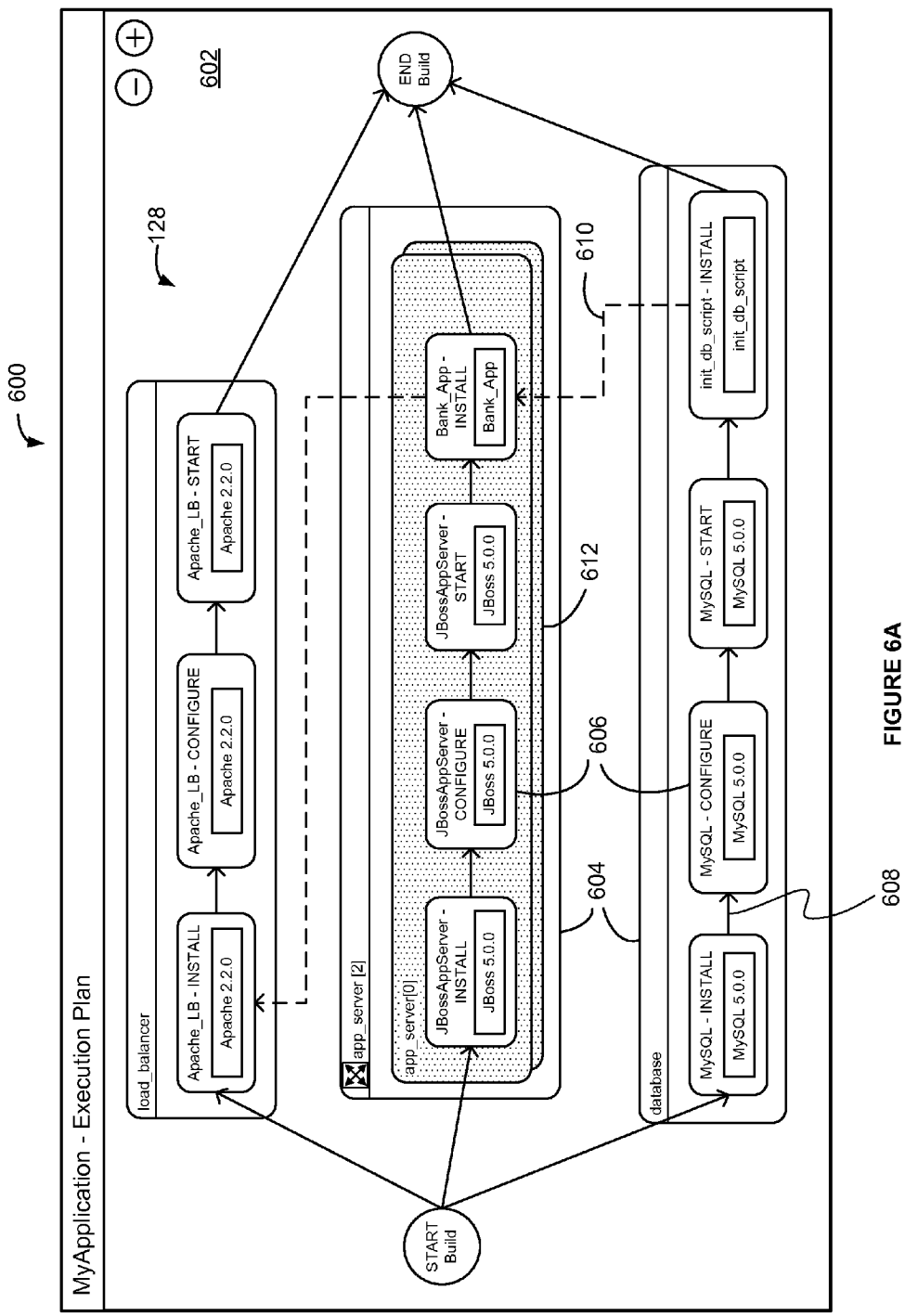
FIGS. 6A-6C show example user interfaces for viewing a deployment plan generated according to an application blueprint.

FIG. 6A shows an example user interface 600 for viewing a deployment plan 128 generated according to an application blueprint. User interface 600 includes a canvas 602 having a plurality of nodes 604 representing virtual machines provisioned in the deployment environment. Each node 604 includes a plurality of tasks 606 representing action scripts to be executed on the virtual machine included therein. FIG. 6A depicts the three-tiered application example described above having an Apache load balancer, MySQL database, and JBoss application server executing a web application (e.g., "bank_app").

Deployment time dependencies that represent an order of execution are depicted by solid directional lines 608 and dashed directional lines 610. Accordingly, deployment plan 128 specifies that a task does not begin execution until a preceding task, as indicated by directional lines 608, has been completed. For example, a virtual machine (labeled as "database") executes action scripts for installing, configuring, and starting a MySQL database service (scripts identified as "MySQL-INSTALL," "MySQL-CONFIGURE," "MySQL-START," respectively). Because of the dependency implied by the container-relationship between the MySQL database and SQL script, the task for executing the "init_db_script" SQL script (e.g., "init_db_script-INSTALL") is placed after the last task for deploying the MySQL database (e.g., "MySQL-START") has been completed. Similarly, the tasks for deploying the bank application (e.g., "Bank_App-INSTALL") are placed after the last task for deploying the JBoss application server.

Deployment plans 128 further specify that a task 606 may wait for completion of a task in another virtual machine (e.g., inter-node dependency), as indicated by a dashed directional line 610. In the three-tiered application example, deployment plan 128 specifies that tasks for deploying the web application (e.g., "bank_app-INSTALL") does not begin execution until the task for executing the database initialization script (e.g., "init_db_script-INSTALL") has been completed.

Figure 6B:
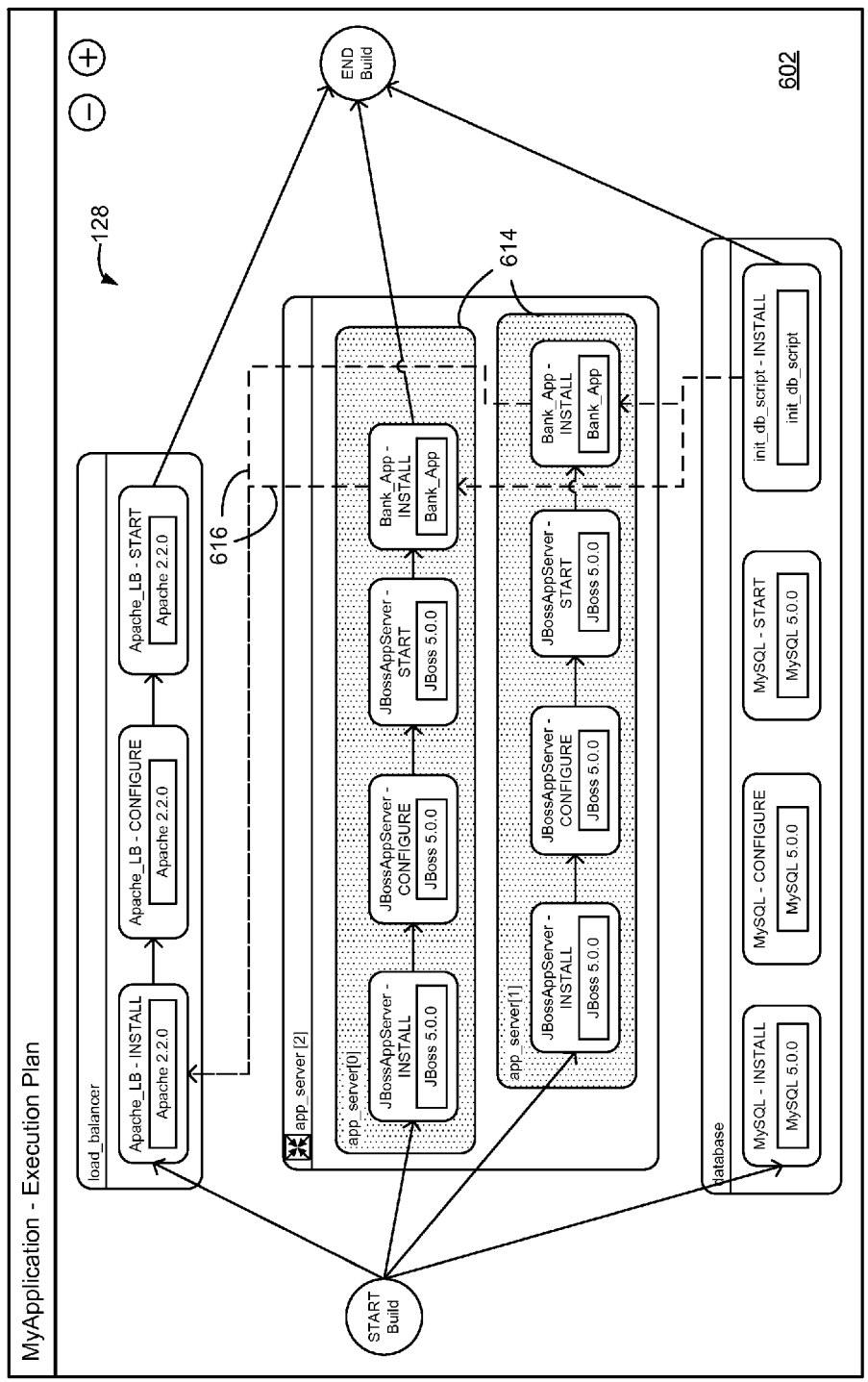

Additionally, user interface 600 depicts nodes 604 that represent a cluster of virtual machines in aggregate as a single node 612, or alternatively, in an expanded view shown in FIG. 6B, renders each virtual machine in the cluster as separate sub-nodes 614 having an own set of tasks to be performed. In the three-tiered application example, the clustered application server node (e.g. "app_server") is depicted as having sub-nodes 614 (e.g., identified as "app_server[0]" and "app_server[1]"). Each sub-node 614 includes an additional set of deployment time dependencies (depicted with directional dashed lines 616) from all tasks in a clustered node to tasks in another node to represent that a task in all sub-nodes 614 must be completed before the task in the other node may begin. For example, in the three-tiered application example, deployment plan 128 indicates that the bank_app INSTALL tasks in app_server[0] and app_server[1] nodes must both be completed before INSTALL task for the load_balancer may begin.

Figure 6C:
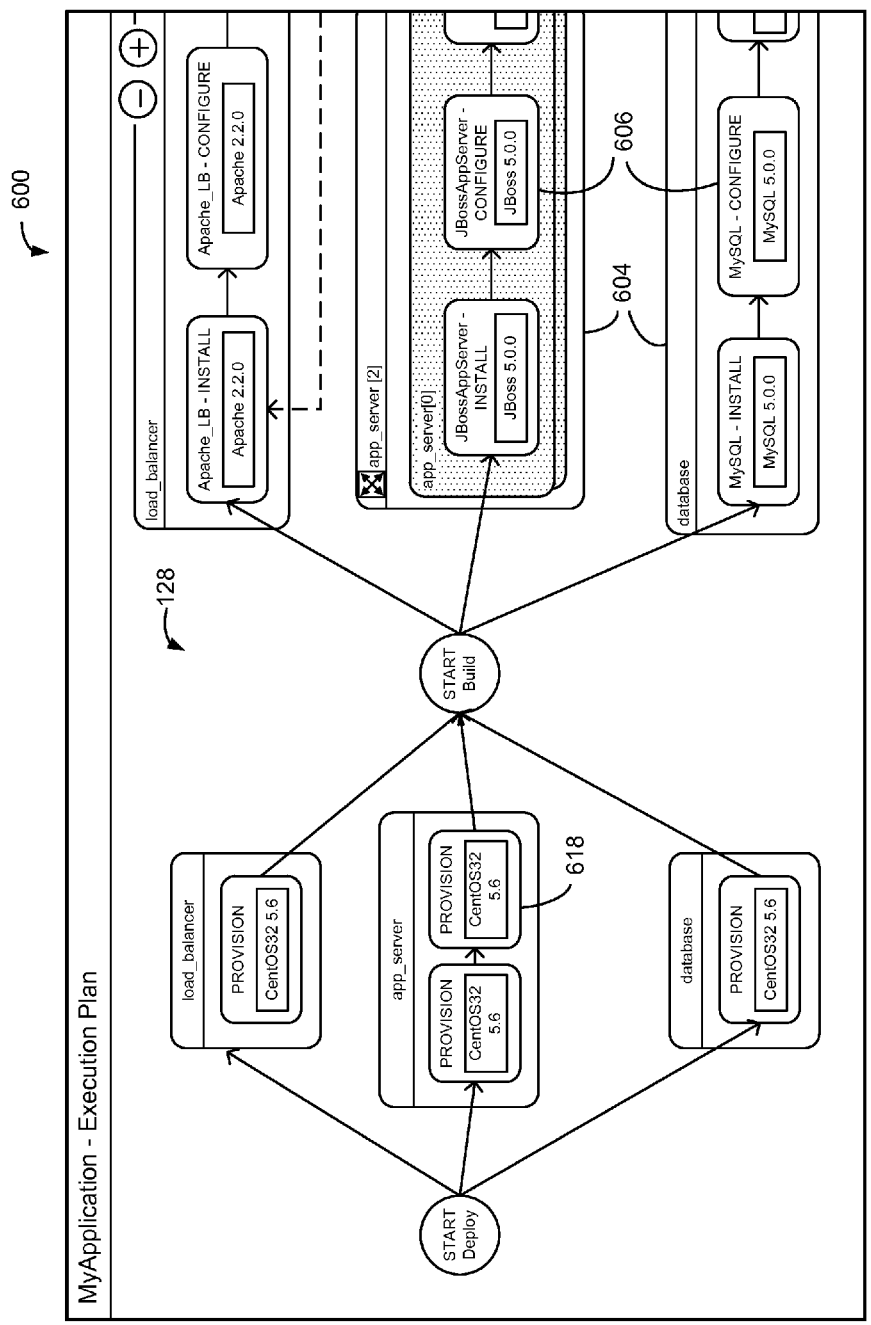

In an alternative embodiment shown in FIG. 6C, user interface 600 depicts tasks 618 for requesting provision of a virtual machine for each node specified in blueprint 126 and as according to a cloud template mapped to logical templates specified in blueprint 126. For example, deployment plan 128 includes tasks 618 (e.g., "load_balancer-PROVISION") to provision virtual computing resources according to a cloud template (e.g., "CentOS32 5.6"). As shown in FIG. 6C, deployment plan 128 specifies that provisioning tasks 618 for virtual machines are performed before deployment tasks for application components (e.g., MySQL, JBoss Application server, etc.).

Execution of Deployment Plan

Having generated a deployment plan 128, deployment director 124 of application director 106 communicates with cloud provider 110 to execute deployment plan 128 within a deployment environment 112.

Figure 7:
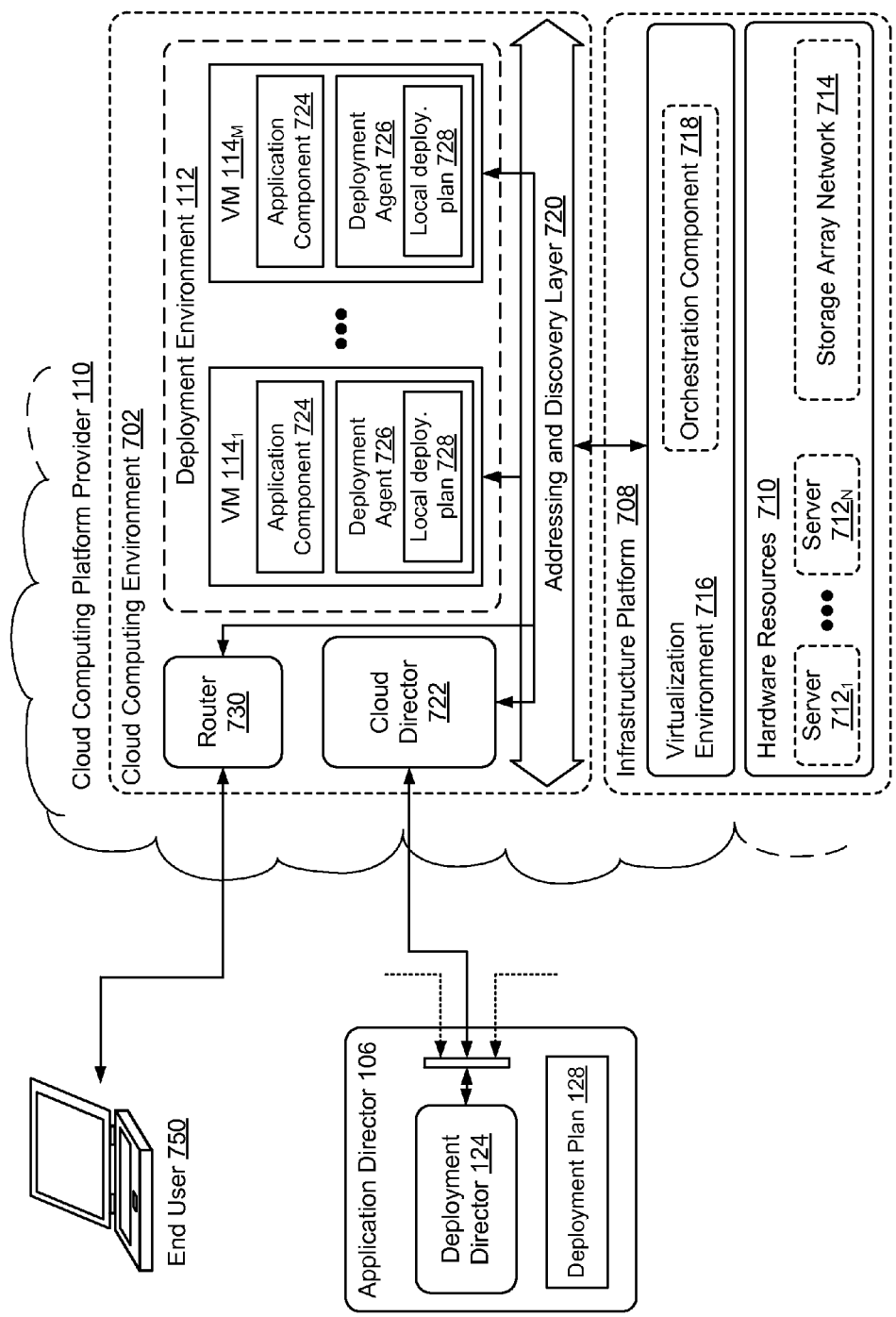
FIG. 7 depicts an example cloud computing platform with which one embodiment of the present invention may be utilized.

FIG. 7 depicts an example cloud computing platform provider 110 with which one embodiment of the present invention may be utilized. As described above, enterprise 100 desires to deploy on a web application (or any other type of application) in a deployment environment 112 provided by cloud provider 110. For example, cloud provider 110 may utilize a cloud computing environment 702 accessible, for example, via REST (Representational State Transfer) APIs (Application Programming Interface) or any other client-server communication protocol, to provide virtual computing resources on which enterprise 100 desires to deploy its web application.

Cloud provider 110 utilizes an infrastructure platform 708 upon which a cloud computing environment 702 may be executed. In the particular embodiment of FIG. 7, infrastructure platform 708 comprises hardware resources 710, such as servers $712_1$ to $712_N$ and one or more storage array networks (SAN), such as SAN 714, which are configured in a manner to provide a virtualization environment 716 that supports the execution of a plurality of virtual machines across servers $712_1$ to $712_N$. As further detailed below, these virtual machines provide the virtual computing resources (e.g., compute, networking, and storage resources) that make up cloud computing environment 702.

Virtualization environment 716 of FIG. 7 includes an orchestration component 718 (e.g., implemented as a process running in a virtual machine in one embodiment) that provides infrastructure resources to cloud computing environment 702 responsive to provisioning requests. For example, if deployment director 124 required a specified number of virtual machines to deploy a web applications or to modify (e.g., scale) a currently running web application to support peak demands, responsive to a request from deployment director 124, orchestration component 718 can initiate and manage the instantiation of virtual machines (e.g., VMs $114_1$ to $114_M$) on servers $712_1$ to $712_N$ to support such requests. In one embodiment, orchestration component 718 instantiates virtual machines according to a requested cloud template that defines a virtual machine having specified virtual computing resources (e.g., compute, networking, storage resources). Further, orchestration component 718 monitors the infrastructure resource consumption levels and requirements of cloud computing environment 702 (e.g., by monitoring communications routed through addressing and discovery layer 720 as further detailed below) and provides additional infrastructure resources to cloud computing environment 702 as needed or desired. In one example, virtualization environment 716 may be implemented by running VMware ESX™ based hypervisor technologies on servers $712_1$ to $712_N$ provided by VMware, Inc. of Palo Alto, Calif. (although it should be recognized that any other virtualization technologies, including Xen® and Microsoft Hyper-V virtualization technologies may be utilized consistent with the teachings herein).

Cloud computing environment includes a cloud director 722 (e.g., run in one or more virtual machines) that manages allocation of virtual computing resources to application director 106 for deploying applications. Cloud director 722 authenticates connection attempts from application director 106 using received cloud provider credentials, for example, as described above. Cloud director 722 maintains and publishes a catalog of available cloud templates that represent virtual machines that may be provisioned from cloud computing environment 702. Cloud director 722 receives provisioning requests submitted to cloud provider 110 and may propagates such requests to orchestration component 718 to instantiate the requested virtual machines (e.g., VMs $114_1$ to $114_M$). In one embodiment, cloud director 722 receives provisioning requests for cloud templates that have been mapped to a logical template in application blueprints 126.

In the embodiment of FIG. 7, cloud computing environment 702 supports a deployment environment 112 having a plurality of virtual machines (identified as VMs $114_1$ to $114_M$) instantiated to host deployed web applications. For example, the deployment by enterprise 100 of a web application having application components 724 results in the hosting of application components 724 in VMs $114_1$ to $114_M$ of deployment environment 112 at cloud computing platform provider 110. A VM (e.g., VM $114_1$) may include a pre-installed bootstrap script that, upon first boot, retrieves a deployment agent 726 (e.g., packaged as a JAR file) from deployment director 124. Alternatively, deployment agent 726 may be pre-installed on VM $114_1$ via inclusion in a cloud template defined by cloud director 722. Deployment agent 726 running on each VM receives a local deployment plan 728 from deployment server and executes local deployment plan 728 in coordination with deployment director 124.

Addressing and discovery layer 720 provides a common interface through which components of cloud computing environment 702 (e.g., cloud director 722, and VMs 114₁ to 114$_M$ in deployment environment 112) can communicate and receive notifications. For example, deployment director 124 of application director 106 may communicate through addressing and discovery layer 720 to broadcast local provisioning plans during deployment of web applications in cloud computing environment 702. Similarly, VM 114₁ may broadcast a notification through addressing and discovery layer 720 to poll for permission to execute of a task from a local provisioning plan and to indicate successful execution of a task from a local provisioning plan. In one embodiment, addressing and discovery layer 720 is implemented as a message brokering service (e.g., running in one or more virtual machines) that defines a common protocol and message format through which components of cloud computing environment 702 can exchange messages and broadcast notifications and other information. In such an embodiment, the components of cloud computing environment 702 establish a connection with the message brokering service (e.g., also sometimes referred to as "subscribing" to the message brokering service), for example, through known authentication techniques (e.g., passwords, etc.) and, once connected to the message brokering service, can provide, receive and request messages, notifications and other similar information to and from other components that have also subscribed to the message brokering system. One example of a message brokering service that may be used in an embodiment is RabbitMQ™ which is based upon the AMPQ (Advanced Message Queuing Protocol) open protocol standard. It should be recognized, however, that alternative interfaces and communication schemes may be implemented for addressing and discovery layer 720 other than such a message brokering service.

Deployment director 124 (e.g., run in one or more virtual machines) orchestrates execution of a deployment plan 128 for an application in coordination with virtual machines (e.g., VMs 114₁ to 114$_M$) participating in the deployment. Deployment director 124 separates deployment plan 128 into local deployment plans 728 for each node that are executed by deployment agent 726 on each node. Deployment director 124 maintains a central state of the deployment process that understands the deployment time dependencies between tasks to be performed across nodes (e.g., VMs 114₁ to 114$_M$) in a specific order. Deployment director 124 broadcasts transmits notification to deployment agent 726 on each node to indicate resolution of deployment time dependencies between tasks in local deployment plans 728. Additionally, deployment director 124 monitors the status of deployment agents 726 and may perform a heartbeat procedure when a deployment agent 726 becomes unresponsive.

Once deployment director 124 of application director 106 successfully orchestrates the deployment of web application in VMs 114₁ to 114$_M$, an end user 750 can access the deployed application, for example, through a web browser or any other appropriate client application residing on a computer laptop or other computer terminal. Router 730 (e.g., run in one or more virtual machines) receives the web browser's access request (e.g., a uniform resource locator or URL) and routes the request to deployment environment 112 which hosts the deployed application. More generally, router 730 maintains mappings in internal routing tables between URLs and deployed applications in order to properly route URL requests from customers to the appropriate deployment environments 112 hosting the requested web applications (as well as maintain load balancing among web application instances, etc.). These mappings are received by router 730 through address and discovery layer 720 when a cloud director 722 successfully provisions virtual computing resources for hosting an application and broadcasts routing information (e.g., hostname, network address information, port number, etc.) for the provisioned VMs through addressing and discovery layer 720.

Figure 8A:
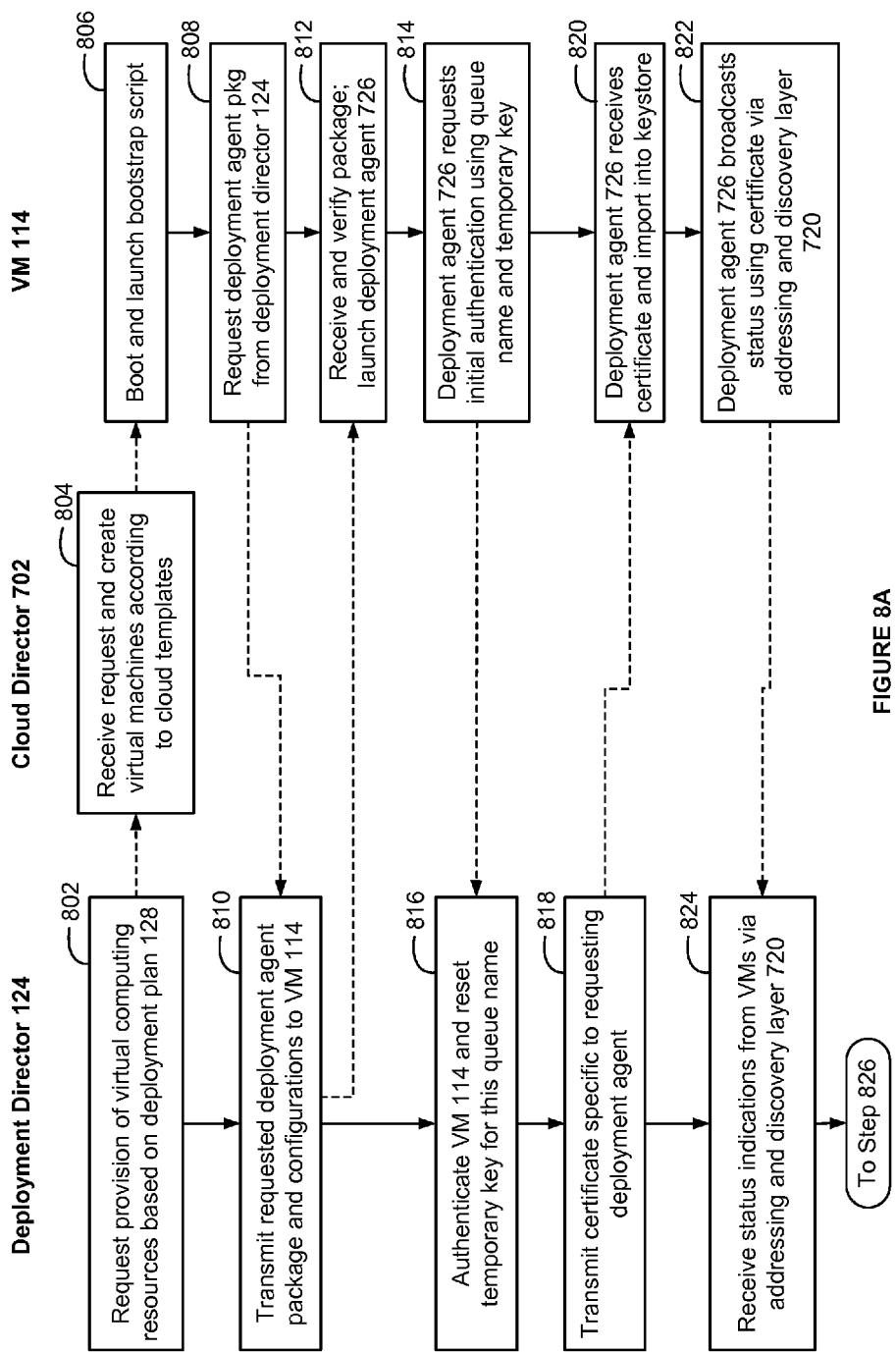
FIG. 8A is a flow diagram that illustrates steps for coordinating communication between a deployment server and deployment agents executing on VMs in a cloud computing environment.
Figure 8B:
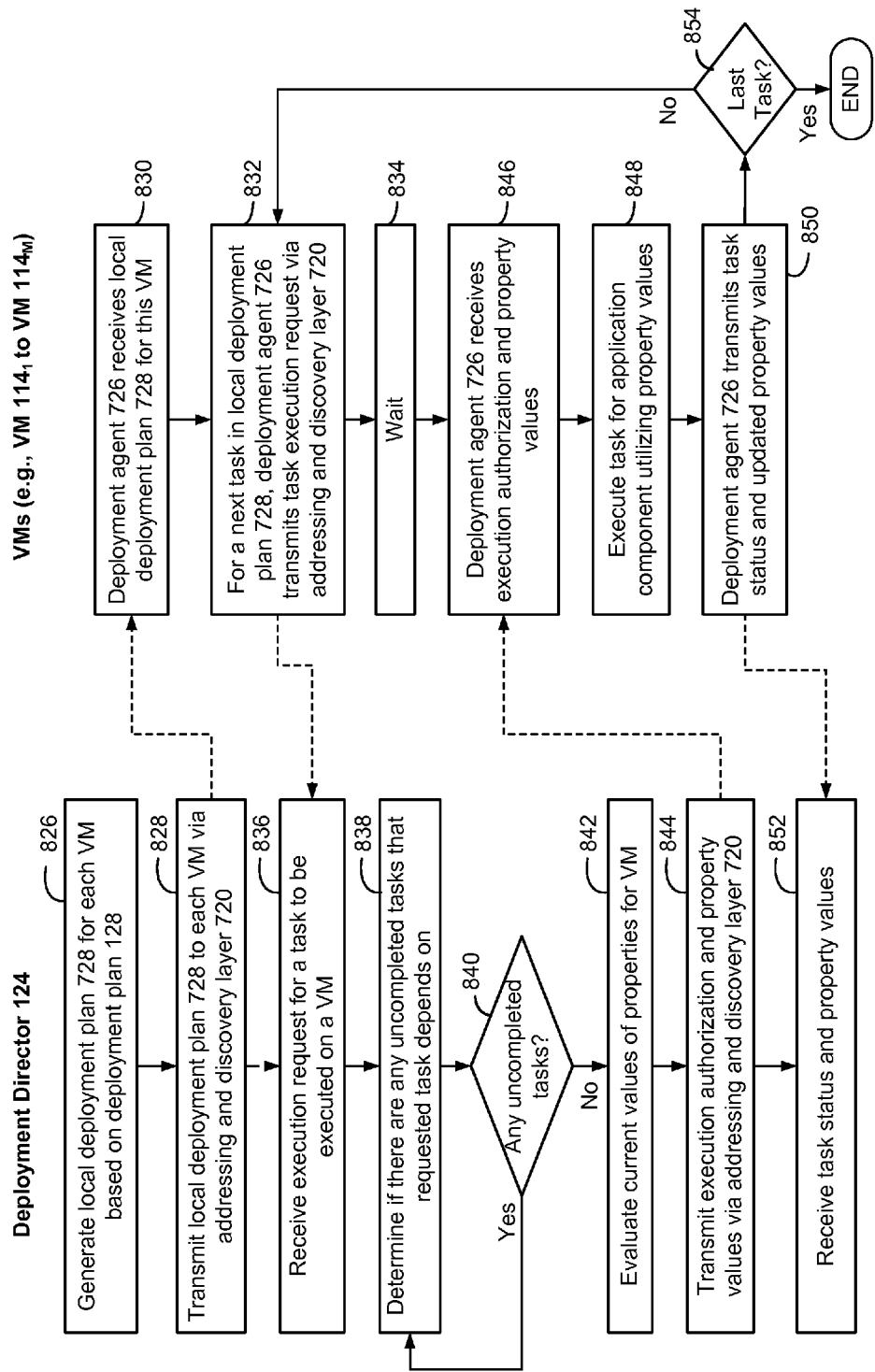
FIGS. 8B and 8C are flow diagrams that illustrate steps for executing a deployment plan to deploy an application on VMs in a cloud computing environment.
Figure 8C:
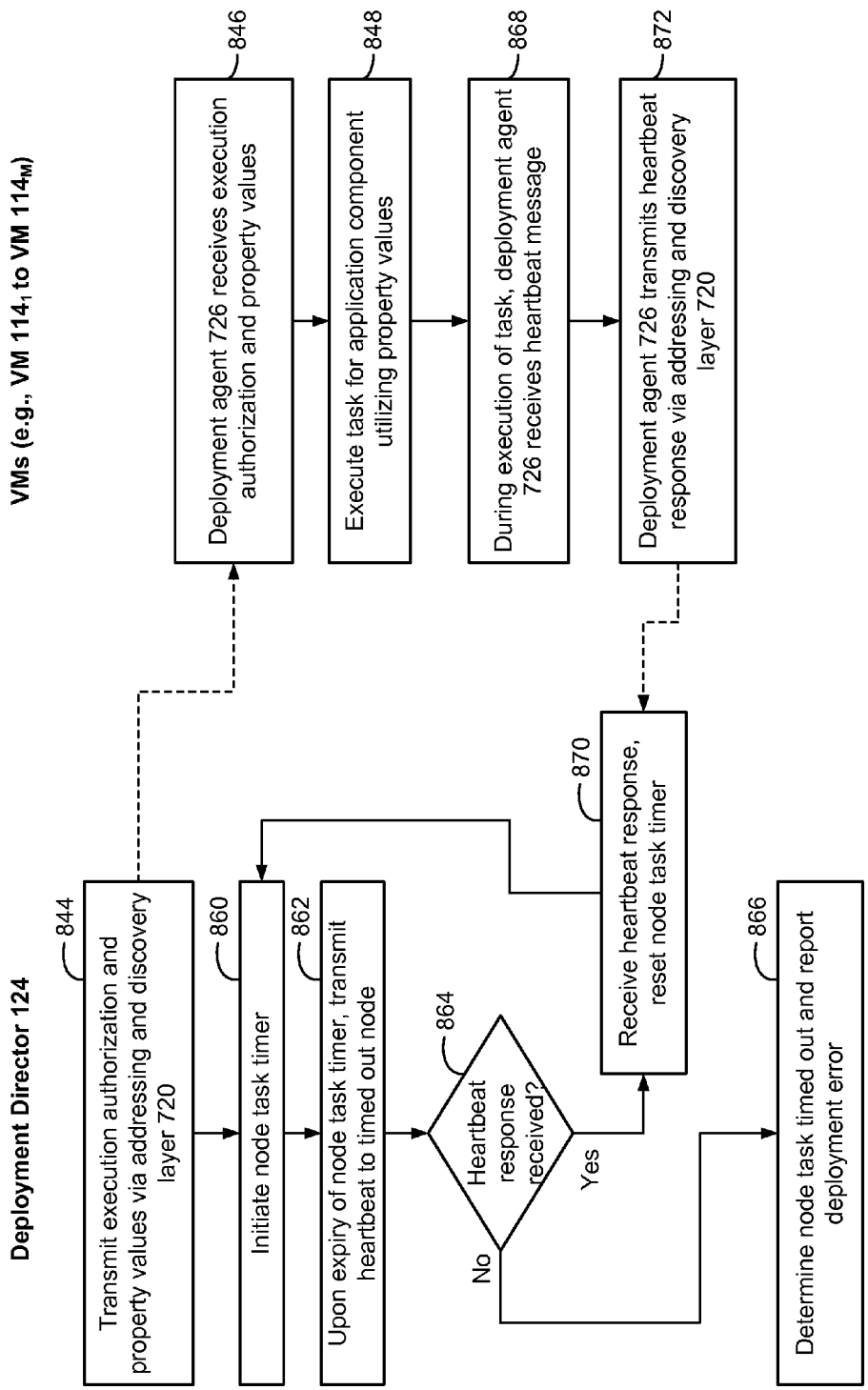

FIG. 8A is a flow diagram that illustrates steps for coordinating communication between deployment director 124 and deployment agents 726 executing on VMs (e.g., VMs 114₁ to 114$_M$) in a cloud computing environment. It should be recognized that, even though the steps of FIGS. 8A-C are described in conjunction with the systems of FIG. 1 and FIG. 7, any system configured to perform the method steps, in any order, is within the scope of embodiments of the invention.

In step 802, deployment director 124 requests cloud director 722 for provision of virtual computing resources based on deployment plan 128. The provisioning request allows for creation of virtual machines according to one or more cloud templates published as available by cloud provider 110. In step 804, cloud director 722 receives the request and creates one or more VMs (e.g., VMs 114₁ to 114$_M$) according to a cloud template requested by deployment director 124.

VM 114₁ proceeds to establish communication with deployment director 124 for coordinating deployment in the cloud computing environment. In one embodiment, in step 806, VM 114₁ boots and launches a bootstrap script that initializes VM 114₁ to support communication with deployment director 124. The bootstrap script provides information for an initial communication with deployment director 124, for example, a resource location (e.g., URL) for retrieving deployment agent 726 from deployment director 124. In step 808, VM 114₁ requests an application package containing deployment agent 726 from deployment director 124. In an alternative embodiment, deployment agent 726 may be pre-installed on VM 114 via a customized cloud template.

In step 810, responsive to the request from VM 114₁, deployment director 124 transmits the requested package that includes deployment agent 726 (e.g., a JAR file containing deployment agent 726) in addition to deployment agent configurations to VM 114₁. The deployment agent configurations are specific to VM 114 and specify how deployment agent 726 executing on VM 114 may communicate with deployment director 124 through a messaging system, such as addressing and discovery layer 720. In one example, deployment agent configurations may include network address for addressing and discovery layer 720 and a unique address (e.g., queue name) that uniquely identifies communications intended for deployment agent 726. Deployment agent configurations may include a one-time password (e.g., temporary key) generated by deployment director 124 and associated with the specific VM 114 (e.g., via unique address) to enable a secure method by which deployment agent 726 can initially authenticate itself to deployment director 124.

In step 812, VM 114₁ receives the deployment agent package and verifies the integrity and/or authenticity of the deployment package, for example, using a fingerprint or checksum value (e.g., MD5 hash value) that is provided with deployment agent configurations in step 810. VM 114₁ executes the deployment agent package to launch deployment agent 726 utilizing received deployment agent configurations. Deployment agent 726 proceeds to authenticate itself with deployment director 124 to establish a secure method of communication, for example, by requesting a digital certificate that allows encrypted communications. In step 814, deployment agent 726 executing on VM 114₁ transmits an initial authentication request to deployment director 124 using the unique address (e.g., queue name) and one-time password provided from the deployment agent configurations received in step 812.

In step 816, deployment director 124 authenticates VM 114₁ based on the received the unique address (e.g., queue name) and one-time password. Responsive to authenticating deployment agent 726 executing on VM 114₁, in step 818, deployment director 124 generates a digital certificate (or any suitable cryptographic key mechanism) specific to the requesting deployment agent 726 that is used for authorization and authentication of future communications with deployment agent 726. For example, deployment director 124 may generate a digital certificate that incorporates the unique address into the digital certificate, such as part of the common name (CN) of the digital certificate. Deployment director 124 provides the certificate to deployment agent 726, which in turn, receives and imports the digital certificate into a keystore, in step 820. It is understood that foregoing communications with deployment director 124 may utilize the digital certificate for encrypted and secure communications. Having authenticated itself with deployment director 124, deployment agent 726 executing on VM 114₁ is deemed "bootstrapped" and is now ready for use in a deployment process for an application. In step 822, deployment agent 726 broadcasts its available status via secure communication with addressing and discovery layer 720. In step 824, deployment director 124 receives status messages from VMs (e.g., VM 114₁ to 114$_M$) via addressing and discovery layer 720 that indicate that provisioned VMs are ready to host application components of the application being deployed. Operations of FIG. 8A continue to step 826, shown in FIG. 8B.

FIG. 8B is a flow diagram that illustrates steps for executing deployment plan 128 to deploy an application on VMs in a cloud computing environment. In the embodiment shown in FIG. 8B, deployment plan 128 is executed by deployment agents 726 running on VMs 114₁ to 114$_M$ in coordination with deployment director 124. In step 826, based on deployment plan 128, deployment director 124 generates a local deployment plan 728 for each VM (e.g., VMs 114₁ to 114$_M$) participating in deployment is responsible for executing. Rather than giving a global view via deployment plan 128 to each VM (e.g., VMs 114₁ to 114$_M$), orchestration of the deployment process is centralized at deployment director 124 by including in each local deployment plan 728 only those tasks that the corresponding VM executes. In one embodiment, deployment director 124 separates deployment plan 128 by node (e.g., nodes 604 or sub-nodes 614 of FIG. 6A) and into sets of tasks to be performed in a specified order by each corresponding VM (e.g., VMs 114₁ to 114$_M$). For example, in the three-tiered application example, deployment director 124 generates a local deployment plan 728 for a VM corresponding to the load_balancer node that includes an installation task, a configuration task, and a starting task for Apache web service (e.g., "Apache_LB-INSTALL," "Apache_LB-CONFIGURE," "Apache_LB-START"). In step 828, local deployment plans 728 are transmitted by deployment director 124 to each VM via addressing and discovery layer 720, and are received by deployment agents 726 running on VMs (e.g., VMs 114₁ to 114$_M$) in step 830.

In step 832, deployment agent 726 processes local deployment plan 728 to determine a first task to be performed according to an execution order specified by local deployment plan 728. Deployment agent 726 transmits a task execution request to deployment director 124 via addressing and discovery layer 720 to determine whether deployment agent 726 can proceed with execution of the first task. Deployment agent 726 proceeds to wait in step 834 until receipt of authorization to proceed with execution of the first task in local deployment plan 728.

In step 836, deployment director 124 receives an execution request for a task to be executed by a deployment agent 726 hosted on a VM (e.g., VMs 114₁ to 114$_M$). In step 838, deployment director 124 determines if there any uncompleted tasks that the requested task depends on according to deployment plan 128. As described above, deployment director 124 maintains a centralized state of the deployment process that includes a status (e.g., incomplete, complete, in progress) for all tasks to be executed on all VMs during deployment. Further deployment director 124 tracks an execution order provided by deployment plan 128 comprised of deployment time dependencies between tasks within the same node and/or between different nodes. Accordingly, deployment director 124 utilizes deployment plan 128 to determine whether there are any tasks upon which the task requesting execution depends, and if so, whether these tasks have been completed yet. The existence of any uncompleted tasks from which the requested task depends blocks execution of the requested tasks.

As such, in step 840, responsive to determining that there are indeed uncompleted tasks upon which the requested task depends, deployment director 124 may return to step 838 to repeatedly check for completion of the tasks upon which the requested task depends. Deployment director 124 may determine that the dependent tasks have been completed using a variety of communication, messaging, and notification mechanisms, such as, a polling mechanism to periodically check for completion of the dependent tasks. In another example, deployment director 124 may register the requested task with a callback mechanism that maintains a list of which tasks are currently being blocked by which tasks and triggers notification when tasks have been completed.

Responsive to determining that there are no uncompleted tasks upon which the requested task depends, in step 842, deployment director 124 evaluates current values of properties specified for the VM according to blueprint 126. As described above, particular properties may be specified for application components to provide configuration values during execution of tasks for the application components (e.g., installation, configuration, start-up). Some property values may be utilized across multiple application components in the deployed application. For example, a web application may be configured to access a database server using database user credentials (e.g., username, password) specified by a property value (e.g., $database.username) defined in blueprint 126. However, certain property values are determined dynamically during deployment and cannot be made available initially, for example, in step 828, when local deployment plans 728 are transmitted. For example, a database password may be randomly generated and is not determined until the database server has been initialized. As such, deployment director 124 centrally manages property values for all application components and all nodes and distributes property values to deployment agents 726 throughout the deployment stage. For example, the database password that is dynamically generated at the database server may be transmitted to deployment director 124 that, in turn, provides the database password to the web application as needed. In one embodiment, deployment director 124 generates a set of property values specific to properties specified for a given node.

In step 844, deployment director 124 transmits authorization to execute the requested task as well as a set of property values for the VM via addressing and discovery layer 720. In step 846, deployment agent 726 receives the execution authorization and property values. While embodiments of the invention describe the authorization to execute the requested task as an express message passed to deployment agents 726, it should be recognized that a variety of communication, messaging, and notification mechanisms, including implied notifications, may be utilized. One example of an implied notification is the establishment of a communication channel (e.g., socket) with deployment director 124. To implicitly notify that deployment agent 726 may proceed with executing a task, deployment director 124 may close or shutdown the communication channel to signal authorization to execute. In step 848, deployment agent 726 executes the task for an application component utilizing the received property values. In one embodiment, the received property values are embodied in a script that, when executed, sets values for environmental variables in an execution environment that executes the task.

In step 850, deployment agent 726 transmits a task status that indicates successful or unsuccessful completion of the task via addressing and discovery layer 720. In one embodiment, deployment agent 726 provides status output, log records, and other output (e.g., verbose text output from a UNIX shell) resultant from execution of the task. Deployment agent 726 further transmits an updated set of property values post-execution of the task to propagate any updated property values to other deployment agents 726 hosted on VMs. In step 852, deployment director 124 receives task status and updated property values and updates the central state of the deployment process to indicate the completion of a task by deployment agent 726 and to reflect the updated property values. In one embodiment, deployment director 124 generates deployment metadata to provide status of deployment, for example, by recording task start and end times for each task executed. Task start time may be tolled upon transmission of authorization to execute a requested tasks (e.g., at step 844); task end times may be tolled upon receipt of a task status from deployment agent 726 (e.g., at step 850).

In step 854, deployment agent 726 determines whether the executed task is the last task in local deployment plan 728, and if so, terminates execution. Responsive to determining that there are additional tasks to be performed in local deployment plan 728, deployment agent 726 returns to step 832 and determines a next task in local deployment plan 728 to be performed.

FIG. 8C is a flow diagram that illustrates alternative steps for executing deployment plan 128 to deploy an application on VMs in a cloud computing environment. Deployment director 124 may utilize a heartbeat mechanism to proactively monitor deployment agents 726 in deployment environment 112. In one embodiment, the heartbeat mechanism allows deployment director 124 to detect failure of deployment agents 726 (e.g., due to host failure, networking failure, etc.). As shown in FIG. 8C, after transmitting execution authorization in step 844, deployment director 124 may initiate a node task timer, in step 860, which defines a "timeout" period for deployment agent 726. The node task timer is configured as a maximum amount of time before deployment agent 726 is deemed "timed out" and is checked for failure. In step 862, upon expiry of the node task timer, deployment director 124 transmits a heartbeat message to the "timed out" node via addressing and discovery layer 720. The heartbeat message may request a response with agent status and tasks within a specified response period (e.g., within 1 minute of the heartbeat).

Meanwhile, as discussed above, deployment agent 726 hosted on VM 114 receives authorization to execute a requested task in step 846 and proceeds to do so in step 848. It is appreciated that a significant amount of time, that may exceed the timeout period of the node task timer, may be needed to complete execution of a task. In step 868, during execution of a task, deployment agent 726 may receive a heartbeat message from deployment director 124 that requests deployment agent 726 to report status within a specified response period. In step 872, deployment agent 726 transmits a heartbeat response to deployment director 124 to indicate deployment agent 726 is alive and active and that the task is still being executed.

In step 864, deployment director 124 determines whether a heartbeat response has been received within the specified response period. Responsive to determining that no heartbeat response has been received within the specified response period, in step 866, deployment director 124 deems deployment agent 726 to be "dead" and updates the central state of the deployment as having failed. In step 870, responsive to determining that a heartbeat response has been received within the specified response period, deployment director 124 restarts the node task timer, or alternatively, modifies the node task timer to extend the timeout period, and returns to step 860. It is noted that deployment director 124 may interrupt any of the steps discussed above in FIG. 8C upon receipt of a completed task status and updated property values (e.g., in step 852 in FIG. 8B) from deployment agent 726.

Figure 9:
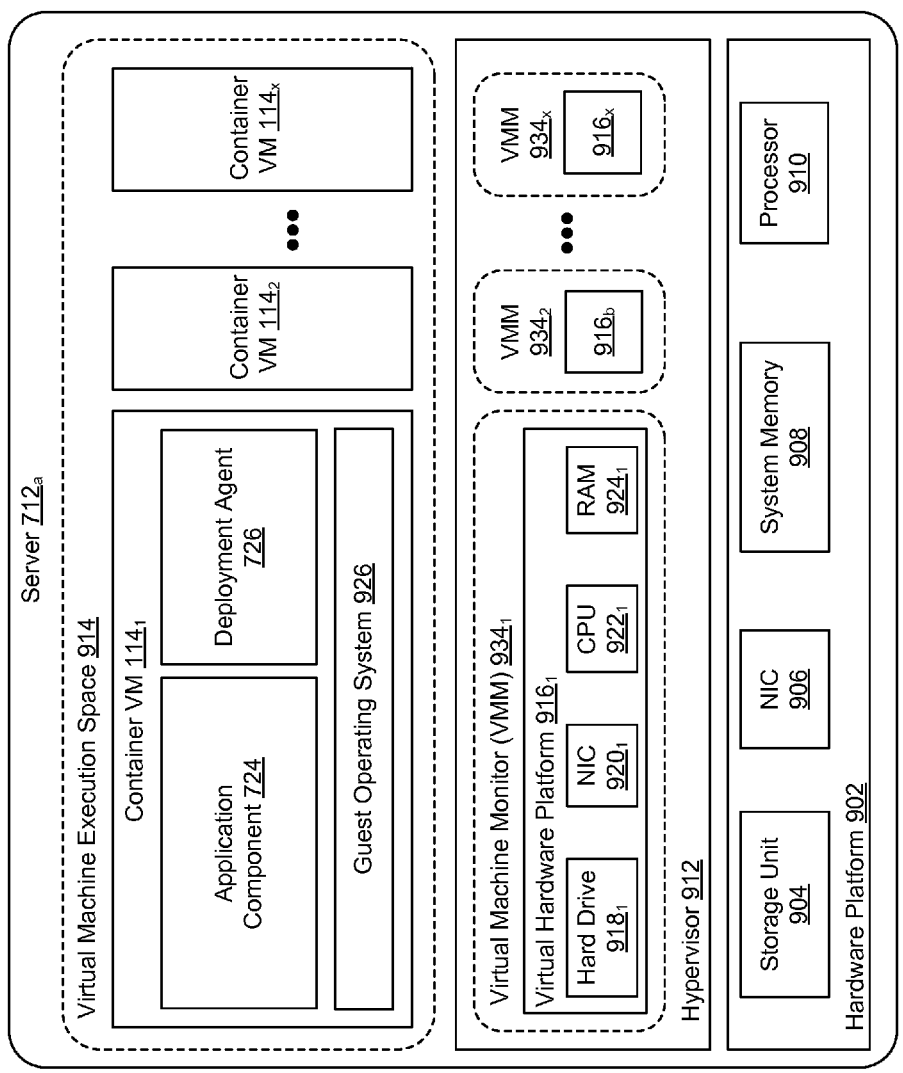
FIG. 9 depicts provisioned virtual machines in a cloud computing platform architecture for hosting an application.

FIG. 9 depicts provisioned virtual machines in a cloud computing platform for hosting application components 724. Such virtual machines are provided to a cloud computing platform, for example, by virtualization environment 716, as previously discussed in the context of FIG. 7. Container VM $114_1$ is hosted on one of servers $712_1$ to $712_N$ (e.g., server $712_1$ as depicted in FIG. 9) comprising a server grade hardware platform 902 such as an x86 architecture platform. Such a hardware platform may include a local storage unit 904, such as a hard drive, network adapter (NIC 906), system memory 908, processor 910 and other I/O devices such as, for example and without limitation, a mouse and keyboard (not shown in FIG. 9).

A virtualization software layer, also referred to hereinafter as hypervisor 912, is installed on top of hardware platform 902. Hypervisor 912 supports virtual machine execution space 914 within which multiple container VMs for hosting application components 724 of an application may be concurrently instantiated and executed. As shown, virtual machine execution space 914 supports VMs $114_1$ to $114_x$. For each of provisioned VMs $114_1$ to $114_x$, hypervisor 912 manages a corresponding virtual hardware platform (i.e., virtual hardware platforms $916_1$-$916_x$) that includes emulated hardware such as virtual hard drive $918_1$, virtual NIC $920_1$, virtual CPU $922_1$, and virtual RAM $924_1$ for VM $114_1$. For example, virtual hardware platform $916_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 926 to execute application component 724 for VM $114_1$, although it should be recognized that, in alternative, embodiments, each of container VMs $114_1$ to $114_x$ may support the execution of multiple application components 724 rather than a single application component. Hypervisor 912 is responsible for transforming I/O requests from guest operating system 926 to virtual hardware platform $916_1$ into corresponding requests to hardware platform 902. In the embodiment of FIG. 9, guest operating system 926 of container VM $114_1$ supports the execution of a deployment agent 726, which is a process or daemon that communicates (e.g., via addressing and discovery layer 720)

with deployment director 124 to receive local deployment plan 728 and execute scripts representing tasks of local deployment plan 728. Execution of the script may include retrieving, unpacking, installing, and configuring application component packages. In one embodiment, the application component package comprises a plurality of files, similar to those in a WAR file, organized into a tape archive file or a "tar" file (also referred to as a tarball), and that may be retrieved via download from a Git repository, package manager, or other similar application component resource. Deployment agent 726 is configured to communicate with deployment director 124 to provide execution status for tasks that have been successfully executed on VM $114_1$ or upon receipt of a heartbeat message. Deployment agent 726 is automatically launched upon the instantiation of a VM in certain embodiments.

It should be recognized that the various terms, layers and categorizations used to describe the virtualization components in FIG. 9 may be referred to differently without departing from their functionality or the spirit or scope of the invention. For example, virtual hardware platforms $916_1$-$916_x$ may be considered to be part of virtual machine monitors (VMM) $934_1$-$934_x$ which implement the virtual system support needed to coordinate operations between hypervisor 912 and their respective container VMs. Alternatively, virtual hardware platforms $916_1$-$916_x$ may also be considered to be separate from VMMs $934_1$-$934_x$, and VMMs $934_1$-$934_x$ may be considered to be separate from hypervisor 912. One example of hypervisor 912 that may be used is included as a component of VMware's ESX™ product, which is commercially available from VMware, Inc. It should further be recognized that other virtualized computer system architectures may be used consistent with the teachings herein, such as hosted virtual machine systems, where the hypervisor is designed to run on top of a host operating system. It should further be recognized, as previously discussed in the context of FIG. 7, that virtualization environment 716 which provides VMs, such as those in FIG. 9, may be supported by hardware resources 710 that comprise any number of physical computers and data storage systems in one or more data centers connected by networking, with each of the physical computers hosting one or more of VMs $114_1$ to $114_M$, and possibly other VMs that run one or more processes carrying out the functions of other components of cloud computing environment 702, such as router 730, cloud director 722, address and discovery layer 720 and the like. As discussed in the context of FIG. 9 with respect to container VMs, each VM supporting such other components is a virtual computer system that may have a guest operating system and one or more guest applications that can include any of the above processes.

While embodiments disclosed herein are discussed with regards to a deployment operation, operations for managing existing deployments may be performed utilizing techniques described herein. For example, an embodiment may be used to: redeploy an already deployed application by updating application-specific code (e.g., going from version 1.0 to version 1.1); upgrade an already deployed application to upgrade the software services (e.g., middleware) of the application, such as updating to the latest version of Apache; backup a deployed application based on knowledge of an application's data storage (e.g., database storage, repositories, etc.) from the blueprint; and patch a deployed application to allow for smaller binary updates to libraries, services, or configurations for security and other reasons.

The various embodiments described herein may employ various computer-implemented operations involving data stored in computer systems. For example, these operations may require physical manipulation of physical quantities usually, though not necessarily, these quantities may take the form of electrical or magnetic signals where they, representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. For example, while embodiments herein have referred to certain methods for establishing communication between deployment director 124 and a VM 114 such as via bootstrap script, it should be recognized that any authentication mechanism may be utilized in alternative embodiments, such as pre-shared keys, encrypted key exchange, digest access authentication, etc. In addition, while embodiments herein have referred to certain mechanisms for communication, such as via addressing and discovery layer 720, between components of the described system (e.g., deployment director 124, VMs 114), it should be recognized that any system for messaging, notification, and other communications, such as polling, callbacks, pull requests (e.g., POST requests, REST APIs), message brokering, etc., may be utilized in alternative embodiments. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance.

Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of deploying an application having multiple application components, the method comprising:
   generating a catalog of a plurality of predefined application components configured to provide a software infrastructure for the application and a plurality of predefined virtual computing resources available in a cloud environment;
   inserting a plurality of logical templates into the catalog, wherein each of the plurality of logical templates is associated with at least one of the plurality of predefined virtual computing resources available to be provisioned in the cloud environment;
   generating mappings between the plurality of logical templates in the catalog and the plurality of predefined virtual computing resources available in the cloud environment;
   generating a topology of virtual computing resources and application components selected from the catalog according to the plurality of logical templates for supporting execution of the application in response to items assembled from the catalog via a canvas-based graphical user interface (GUI);
   inserting, in response to user interactions with the topology in the graphical user interface, one or more dependencies between the application components in the topology; and
   deploying the application in the cloud environment by provisioning cloud computing resources and installing the application components in the cloud computing resources according to the topology and the mappings.

2. The method of claim 1, wherein the step of inserting further comprises:
   defining a dependency between a first application component executing on a first virtual computing resource and a second application component executing on a second virtual computing resource.

3. The method of claim 1, wherein the step of inserting further comprises:
   defining a dependency between a first application component executing on a first virtual computing resource and a second application component executing on the first virtual computing resource.

4. The method of claim 1, wherein the step of generating the topology further comprises:
   defining a configuration property of a first application component that references a value of a configuration property of a second application component.

5. The method of claim 1, further comprising:
   prior to generating the topology, generating the catalog of virtual computing resources that includes definitions of the virtual computing resources and mapping each of the definitions to a definition of a virtual machine that may be provisioned in the cloud environment.

6. The method of claim 1, further comprising:
   prior to generating the topology, generating the catalog of application components that includes definitions of the application components, each of the definitions referencing installation scripts for deploying the application components and one or more configuration properties.

7. The method of claim 1, further comprising:
   prior to generating the topology, generating the catalog comprising a plurality of deployment environments that includes definitions of virtual machines that may be provisioned in the deployment environments.

8. The method of method of claim 1, wherein the step of deploying comprises:
   in response to user input, selecting one of a plurality of deployment environments;
   determining cloud computing resources of the selected deployment environment that are mapped to the topology of virtual computing resources; and
   provisioning the cloud computing resources and deploying the application components on the provisioned cloud computing resources according to dependencies defined in the topology.

9. A non-transitory computer-readable storage medium comprising instructions that, when executed in a computing device, deploy an application having multiple application components, by performing the steps of:
   generating a catalog of a plurality of predefined application components configured to provide a software infrastructure for the application and a plurality of predefined virtual computing resources available in a cloud environment;
   inserting a plurality of logical templates into the catalog, wherein each of the plurality of logical templates is associated with at least one of the plurality of predefined virtual computing resources available to be provisioned in the cloud environment;
   generating mappings between the plurality of logical templates in the catalog and the plurality of predefined virtual computing resources available in the cloud environment;
   generating a topology of virtual computing resources and application components selected from the catalog according to the plurality of logical templates for supporting execution of the application in response to items assembled from the catalog via a canvas-based graphical user interface (GUI);
   inserting, in response to user interactions with the topology in the graphical user interface, one or more dependencies between the application components in the topology; and
   deploying the application in the cloud environment by provisioning cloud computing resources and installing the application components in the cloud computing resources according to the topology and the mappings.

10. The non-transitory computer-readable storage medium of claim 9, wherein the instructions for inserting further comprise instructions for:
    defining a dependency between a first application component executing on a first virtual computing resource and a second application component executing on a second virtual computing resource.

11. The non-transitory computer-readable storage medium of claim 9, wherein the instructions for inserting further comprise instructions for:
    defining a dependency between a first application component executing on a first virtual computing resource and a second application component executing on the first virtual computing resource.

12. The non-transitory computer-readable storage medium of claim 9, wherein the instructions for generating the topology further comprise instructions for:
   defining a configuration property of a first application component that references a value of a configuration property of a second application component.

13. The non-transitory computer-readable storage medium of claim 9, further comprising instructions that, when executed in the computing device, perform the steps of:
   prior to generating the topology, generating the catalog of virtual computing resources that includes definitions of the virtual computing resources and mapping each of the definitions to a definition of a virtual machine that may be provisioned in the cloud environment.

14. The non-transitory computer-readable storage medium of claim 9, further comprising instructions that, when executed in the computing device, perform the steps of:
   prior to generating the topology, generating the catalog of application components that includes definitions of the application components, each of the definitions referencing installation scripts for deploying the application components and one or more configuration properties.

15. The non-transitory computer-readable storage medium of claim 9, further comprising instructions that, when executed in the computing device, perform the steps of:
   prior to generating the topology, generating the catalog comprising a plurality of deployment environments that includes definitions of virtual machines that may be provisioned in the deployment environments.

16. The non-transitory computer-readable storage medium of claim 9, wherein the instructions for deploying further comprise instructions for:
   in response to user input, selecting one of a plurality of deployment environments;
   determining cloud computing resources of the selected deployment environment that are mapped to the topology of virtual computing resources; and
   provisioning the cloud computing resources and deploying the application components on the provisioned cloud computing resources according to dependencies defined in the topology.

17. A computer system for deploying an application having multiple application components, the computer system comprising a system memory and a processor programmed to carry out the steps of:
   generating a catalog of a plurality of predefined application components configured to provide a software infrastructure for the application and a plurality of predefined virtual computing resources available in a cloud environment;
   inserting a plurality of logical templates into the catalog, wherein each of the plurality of logical templates is associated with at least one of the plurality of predefined virtual computing resources available to be provisioned in the cloud environment;
   generating mappings between the plurality of logical templates in the catalog and the plurality of predefined virtual computing resources available in the cloud environment;
   generating a topology of virtual computing resources and application components selected from the catalog according to the plurality of logical templates for supporting execution of the application in response to items assembled from the catalog via a canvas-based graphical user interface (GUI);
   inserting, in response to user interactions with the topology in the graphical user interface, one or more dependencies between the application components in the topology; and
   deploying the application in the cloud environment by provisioning cloud computing resources and installing the application components in the cloud computing resources according to the topology and the mappings.

* * * * *